(12) United States Patent
Li et al.

(10) Patent No.: US 11,809,637 B2
(45) Date of Patent: *Nov. 7, 2023

(54) METHOD AND DEVICE FOR ADJUSTING THE CONTROL-DISPLAY GAIN OF A GESTURE CONTROLLED ELECTRONIC DEVICE

(71) Applicants: Wei Li, Markham (CA); Wei Zhou, Richmond Hill (CA); Sachi Mizobuchi, Toronto (CA); Ghazaleh Saniee-Monfared, Toronto (CA); Juwei Lu, North York (CA); Taslim Arefin Khan, Scarborough (CA); Rafael Veras Guimaraes, North York (CA)

(72) Inventors: Wei Li, Markham (CA); Wei Zhou, Richmond Hill (CA); Sachi Mizobuchi, Toronto (CA); Ghazaleh Saniee-Monfared, Toronto (CA); Juwei Lu, North York (CA); Taslim Arefin Khan, Scarborough (CA); Rafael Veras Guimaraes, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,841

(22) Filed: Sep. 13, 2022

(65) Prior Publication Data
US 2023/0013169 A1  Jan. 19, 2023

Related U.S. Application Data

(63) Continuation of application No. 17/085,866, filed on Oct. 30, 2020, now Pat. No. 11,474,614.
(Continued)

(51) Int. Cl.
G06F 3/01 (2006.01)
G06F 3/04815 (2022.01)
(Continued)

(52) U.S. Cl.
CPC .............. *G06F 3/017* (2013.01); *G06F 3/011* (2013.01); *G06F 3/013* (2013.01); *G06T 7/20* (2013.01);
(Continued)

(58) Field of Classification Search
CPC .......... G06F 3/017; G06F 3/011; G06F 3/013; G06T 7/20; G06T 7/50; G06T 7/70;
(Continued)

(56) References Cited

U.S. PATENT DOCUMENTS 6,323,846 B1  11/2001  Westerman et al.
6,424,338 B1   7/2002  Anderson
(Continued)

FOREIGN PATENT DOCUMENTS

CN  104137031 A    11/2014
CN  105912126 A *   8/2016  ............. G06F 3/017
CN  105912126 A     8/2016

OTHER PUBLICATIONS

Casiez, G., Vogel, D., Balakrishnan, R., & Cockburn, A. The impact of control-display gain on user performance in pointing tasks. Human-computer interaction, 23(3 2008.
(Continued)

*Primary Examiner* — Mihir K Rayan

(57) ABSTRACT

Methods, devices, and processor-readable media for adjusting the control-display gain of a gesture-controlled device are described. Adjusting the control-display gain may facilitate user interaction with content or UI elements rendered on a display screen of the gesture-controlled device. The control-display gain may be adjusted based on a property of how
(Continued)

a mid-air dragging gesture is being performed by a user's hand. The property may be the location of the gesture, the orientation of the hand performing the gesture, or the velocity of the gesture. A hand that becomes stationary for a threshold time period while performing the dragging gesture may adjust the control-display gain to a different level. Control-display gain may be set to a different value based on the current velocity of the hand performing the gesture. The control-display gain levels may be selected from a continuous range of values or a set of discrete values. Devices for performing the methods are described.

16 Claims, 14 Drawing Sheets

Related U.S. Application Data

(60) Provisional application No. 63/015,595, filed on Apr. 26, 2020.

(51) Int. Cl.
    *G06T 7/70*            (2017.01)
    *G06T 7/20*            (2017.01)
    *G06T 7/50*            (2017.01)
    *G06V 40/20*          (2022.01)
    *G06V 10/25*          (2022.01)

(52) U.S. Cl.
    CPC ................ *G06T 7/50* (2017.01); *G06T 7/70* (2017.01); *G06V 10/25* (2022.01); *G06V 40/28* (2022.01); *G06F 3/04815* (2013.01); *G06T 2200/24* (2013.01); *G06T 2207/30196* (2013.01)

(58) Field of Classification Search
    CPC ...... G06T 2200/24; G06T 2207/30196; G06V 40/28; G06V 10/25
    See application file for complete search history.

(56) References Cited

U.S. PATENT DOCUMENTS

| | | | |
|---|---|---|---|
| 8,479,122 B2 | 7/2013 | Hotelling et al. | |
| 11,474,614 B2* | 10/2022 | Li | G06F 3/017 |
| 11,550,406 B1* | 1/2023 | Zhou | G06T 19/006 |
| 2003/0076301 A1 | 4/2003 | Tsuk et al. | |
| 2003/0076306 A1 | 4/2003 | Zadesky et al. | |
| 2008/0089587 A1* | 4/2008 | Kim | G06F 3/0304 |
| | | | 382/190 |
| 2010/0295785 A1* | 11/2010 | Lu | G06F 3/017 |
| | | | 345/159 |
| 2010/0318904 A1 | 12/2010 | Hillis et al. | |
| 2014/0201666 A1 | 7/2014 | Bedikian et al. | |

OTHER PUBLICATIONS

Nancel, M., Chapuis, O., Pietriga, E., Yang, X. D., Irani, P. P., & Beaudouin-Lafon, M. High-precision pointing on large wall displays using small handheld devices. In Proceedings of the SIGCHI Conference on Human Factors in Computing Systems Apr. 2013.

Yeo, H. S., Lee, J., Kim, H. I., Gupta, A., Bianchi, A., Vogel, D., . . . & Quigley, A. Wrist: Watch-Ring Interaction and Sensing Technique for Wrist Gestures and Macro-Micro Pointing. In Proceedings of the 21st International Conference on Human-Computer Interaction with Mobile Devices and Services Oct. 2019.

Nancel, M., Pietriga, E., Chapuis, O., & Beaudouin-Lafon, M. Mid-air pointing on ultra-walls. ACM Transactions on Computer-Human Interaction (TOCHI), 22(5) 2015.

* cited by examiner

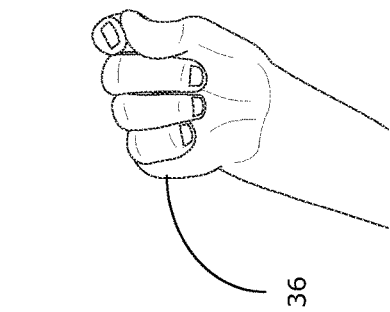
FIG. 3D
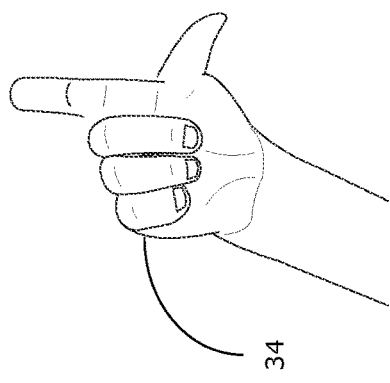
FIG. 3C
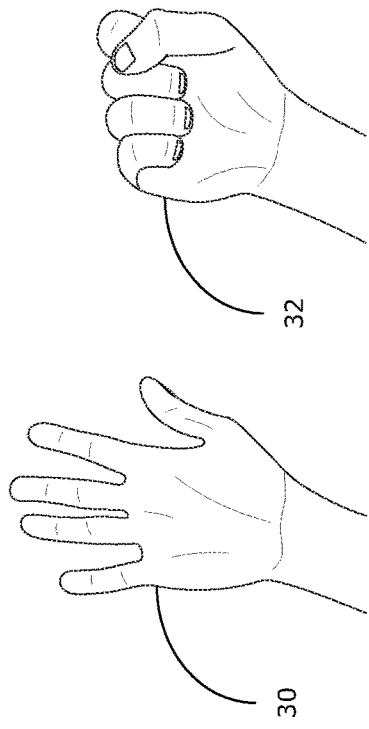
FIG. 3B
FIG. 3A
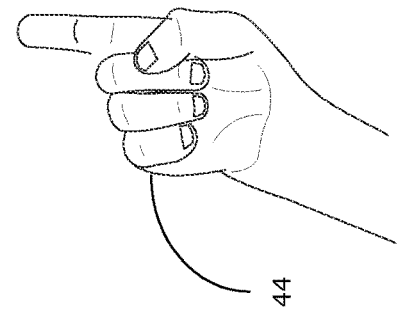
FIG. 3H
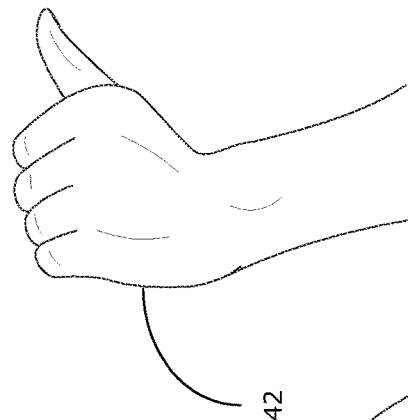
FIG. 3G
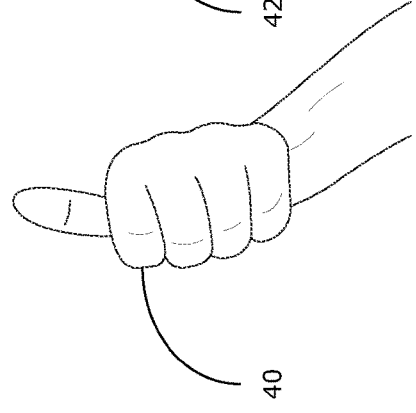
FIG. 3F
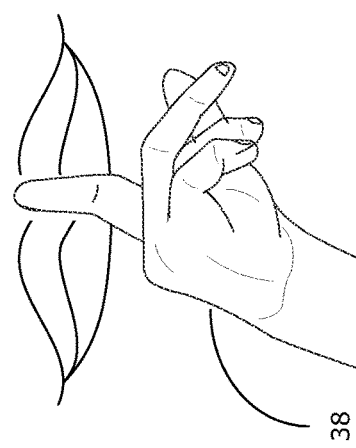
FIG. 3E

METHOD AND DEVICE FOR ADJUSTING THE CONTROL-DISPLAY GAIN OF A GESTURE CONTROLLED ELECTRONIC DEVICE

RELATED APPLICATION DATA

The present application claims priority to U.S. provisional application No. 63/015,595 filed Apr. 26, 2020, the entire contents of which are incorporated herein by reference.

FIELD

The present application generally relates to gesture-controlled electronic devices, and in particular to methods and devices for adjusting the control-display gain of a gesture controlled electronic device.

BACKGROUND

Traditionally, a pointing device, such as a hand-held mouse, a finger or stylus, has been used by a user of an electronic device to control and provide data to an electronic device using physical gestures. For example, moving a hand-held mouse across a physical surface and activating switches (e.g., by pressing buttons) on the mouse enables a user to interact with (i.e., to control and provide data to) an electronic device. Similarly, a touch of a finger or stylus on a touch-sensitive surface of an electronic device, such as a trackpad or touchscreen display of the electronic device, and movement of the finger or stylus on the touch-sensitive surface enables a user to interact with (i.e., to control and provide data) to the electronic device. Movements of a pointing device on a surface are rendered on a display screen of the electronic device by movements of a pointer or cursors on the display screen. The Control-Display (CD) gain describes the proportion between movements of the pointing device and the movements of the pointer or cursor on the display screen of the electronic device. The CD gain setting of an electronic device can be adjusted, for example, by the operating system of an electronic device or by a user of the electronic device.

Because CD gain describes the proportion between movements of the pointing device and the movements of the pointer or cursor on the display screen of the electronic device, it also affects the behavior of the electronic device in response to those pointer movements. Thus, for example, an electronic device may be configured such that the electronic device to responds to a dragging motion of the pointer device in a particular context (e.g., an audio mixer application) by increasing the audio volume of an audio mixer module in proportion to the distance a volume slider is dragged by the pointer device. Thus, if the electronic device has a high CD gain setting and a user initiates a dragging action with a pointer device in the audio mixer context, a small motion by the user of the pointer device may result not only in a large movement of the pointer or cursor on screen but also a large movement of the audio volume slider, and therefore a large increase in the audio volume. Thus, CD gain not only affects the proportion between pointer device movement and what is displayed on the display screen, but also the proportion between the pointer device movement and the degree or magnitude of various commands executed by the electronic device (e.g., magnitude of audio volume increase).

Modern electronic devices, such as televisions, large display screen, vehicle infotainment systems, enable a user to interact with (i.e., to control and provide data to) such electronic devices using gestures performed in a space in front of the electronic device that can be captured in a field of view (FOV) of a camera of the electronic device or a camera connected to the electronic device. Such gestures are referred to as mid-air gestures. For example, mid-air gestures may be used by a user to control digital content rendered on a display screen of the electronic device. However, users of such devices often find it difficult to perform mid-air gestures to control and manipulate content rendered on the display screen, and especially to perform mid-air gestures to make fine-grained adjustments to control content or user interface (UI) elements, such as widgets, rendered on the display screen of such electronic devices.

There thus exists a need for techniques enabling a user of a gesture-controlled electronic device to adjust CD gain to allow gesture control at varying levels of granularity.

SUMMARY

The present disclosure describes methods and devices for adjusting the control-display gain of a gesture-controlled device to facilitate user interaction with content or UI elements rendered on a display screen of a gesture-controlled device. Rather than requiring the user to navigate configuration menus, learn distinct gestures, perform a series of gestures, or perform other cumbersome tasks to adjust CD gain, examples described herein may enable a user to adjust CD gain dynamically while performing an underlying mid-air gesture with one of his or her hands (i.e. the gesture to which the CD gain adjustment will be applied) without the need to perform any preliminary actions or simultaneous gestures with a second hand. In the present disclosure, the terms "mid-air gesture", "hand gesture", and "gesture" shall be used interchangeably to refer to a gesture performed by a user's hand within the field of view of a camera, as described above. A gesture may involve both hand shapes and hand movements, as described in greater detail below with reference to FIGS. 3A-4C.

In examples described herein, the CD gain of the gesture-controlled device is determined with respect to one or more properties of how a user is performing a mid-air gesture. In some examples, the CD gain is determined by the location where the user's hand is performing a gesture, such as a high location or a low location. In some examples, the CD gain is determined by an orientation of the user's hand while performing the gesture. In some examples, the CD gain is adjusted in response to detecting that a user has paused movement of the hand for a period of time performing the gesture. In some examples, the CD gain is adjusted based on the velocity with which the user's hand is moving.

In some aspects, the present disclosure describes a method for adjusting the control-display gain of a gesture-controlled device. The method comprises processing a frame to detect a location and shape of a hand in the frame, generating gesture data for the frame based on the location and shape of the hand, determining that the hand is performing a dragging hand gesture based on gesture data for the frame and gesture data for one or more previous frames, identifying a property of the hand performing the dragging hand gesture, and adjusting a control-display gain for the gesture-controlled device to a control-display gain determined based on the identified property.

In some aspects, the present disclosure describes a gesture-controlled device. The gesture-controlled device comprises a processor device, and a memory. The memory stores machine-executable instructions thereon which, when executed by the processing device, cause the gesture-controlled device to process a frame to detect a mid-air gesture in the frame, determine that the mid-air gesture is a dragging hand gesture, identify a property of the hand performing the dragging hand gesture, and adjust a control-display gain for the gesture-controlled device to a control-display gain determined based on the identified property.

In some examples, the property is the location of the hand.

In some examples, the method further comprises storing the location of the hand in a queue that includes one or more locations of the hand while the gesture-controlled device is in a dragging state, determining a movement of the hand with respect to a first axis based on the one or more locations of the hand stored in the queue, and applying the control-display gain to the movement to generate a drag control output value. The control-display gain is determined based on the location of the hand with respect to a second axis orthogonal to the first axis.

In some examples, identifying the location of the hand comprises determining that the hand is located within a first region of the frame. The control-display gain is a first control-display gain corresponding to the first region.

In some examples, the property is an orientation of the hand relative to a reference orientation.

In some examples, the orientation of the hand comprises an angle of the hand relative to the reference orientation.

In some examples, the angle of the hand is measured with respect to a vertical plane.

In some examples, identifying the orientation of the hand comprises determining that the angle of the hand is within a first angle range defined between a first angle and a second angle, and the control-display gain is a first control-display gain corresponding to the first angle range.

In some examples, the property is a velocity of the hand.

In some examples, identifying the velocity of the hand comprises determining a location of the hand, storing the location of the hand in a queue that includes one or more locations of the hand while the gesture-controlled device is in a drag state, and determining the velocity of the hand based on the one or more locations of the hand stored in the queue. Adjusting the control-display comprises, in response to determining that the velocity has been below a velocity threshold for at least a dwell time threshold, and that the gesture-controlled device is in a first control-display gain state of a plurality of control-display gain states, placing the gesture-controlled device into a second control-display gain state of the plurality of control-display gain states, and adjusting the control-display gain to a control-display gain corresponding to the second control-display gain state.

In some examples, identifying the velocity of the hand comprises determining a location of the hand, storing the location of the hand in a queue that includes one or more locations of the hand while the gesture-controlled device is in a drag state, and determining the velocity of the hand based the one or more locations of the hand stored in the queue. The control-display gain is determined in accordance with a function dependent on the velocity of the hand.

In some examples, the function dependent on the velocity of the hand is a linear function.

In some examples, the function dependent on the velocity of the hand is a generalized logistic function.

In some aspects, the present disclosure describes a processor-readable medium having instructions tangibly stored thereon. The instructions, when executed by a processor device, cause the processor device to perform the method steps described above.

The examples disclosed herein may enable a user to change CD gain without shifting their attention between multiple input spaces. Instead, the user may modify the way he or she performs a baseline gesture (i.e. the gesture used to perform the current UI task) to adjust the CD gain while the current UI task is being performed. A user can choose among various CD gain levels by changing a property of how the baseline gesture is being performed, such as hand location (e.g., height level), hand orientation (e.g., fingers up vs. fingers down), or hand velocity (e.g., pausing to switch between CD gain levels, or changing hand velocity to effect a non-linear CD gain response). These changes of CD gain level may be used to switch between discrete CD gain levels or to traverse a continuous range of CD gain levels.

Some embodiments (such as those using hand orientation or velocity) may enable a user to keep his or her elbow on a table surface, thereby requiring less arm strain than gesture systems that require movement of the hand to a specific location.

Some embodiments may provide a further advantage by providing visual and/or auditory feedback cues to indicate the current CD gain level.

In embodiments relying on hand velocity to change CD gain, the interaction may be more intuitive than existing approaches, because the user may naturally slow down or pause a hand movement when attempting to perform fine-grained movements. In some such embodiments, users do not need to manually shift between a coarse-grained and fine-grained CD gain, resulting in a lower mental workload.

In some embodiments, different types of control widgets (e.g., volume bars, progress bars, etc.) used by a single gesture-controlled device can have their CD gain levels adjusted using a single technique, without the need to learn multiple gestures assigned to different modes.

BRIEF DESCRIPTION OF THE DRAWINGS

Reference will now be made, by way of example, to the accompanying drawings which show example embodiments of the present application, and in which:

FIGS. 3A-3H illustrate some example hand shape classes that may be detected and classified by an example gesture-controlled device;

Similar reference numerals may have been used in different figures to denote similar components.

DESCRIPTION OF EXAMPLE EMBODIMENTS

The present disclosure describes methods and devices for adjusting the CD gain of a gesture-controlled electronic device ("gesture controlled device) using a mid-air gesture. A gesture-controlled device may be a television (e.g., smart TV), a desktop device, a videoconferencing system, a video gaming system, a vehicle-coupled device (e.g., a dashboard device), or a smart speaker, among other possibilities. The methods and systems described herein may be used to enable user interaction with any user interface provided by the gesture-controlled device, including user interfaces rendered on a display device of gesture-controlled device, user interfaces rendered on a display device in communication with the gesture-controlled device. Examples of the methods and systems of the present disclosure may also be implemented for augmented reality (AR) or virtual reality (VR) applications, among other possibilities.

Example Gesture-Controlled Devices and Systems

For simplicity, the present disclosure describes examples in the context of a gesture-controlled device having a display (e.g., a smart television (TV) or a display device in communication with a videoconferencing system), and describes methods and systems for controlling the device for interacting with the device, for example for playback of a video. However, it should be understood that the present disclosure is not limited to such embodiments, and the methods and systems described herein may be used for controlling of a variety of gesture-controlled devices in a variety of applications. For example, some embodiments of the methods and system described herein may use other output devices, such as an audio speaker, to provide feedback information to users. Some embodiments may enable users to use mid-air gestures to interact with other types of content or other software applications, such as a music player, a videoconferencing application, a video game, or a multi-user virtual reality (VR) or augmented reality (AR) environment, among other possibilities.

The use of mid-air gestures for adjusting the CD gain of a gesture-controlled device may have advantages over methods for adjusting the CD gain of a gesture-controlled device. Using mid-air gestures to control such gesture-controlled devices does not require users to hold such gesture-controlled devices for interaction therewith. Furthermore, using mid-air gesture for controlling such gesture-controlled devices may be more hygienic, as users are not required to touch a surface of the gesture-controlled device to interact therewith.

Figure 1:
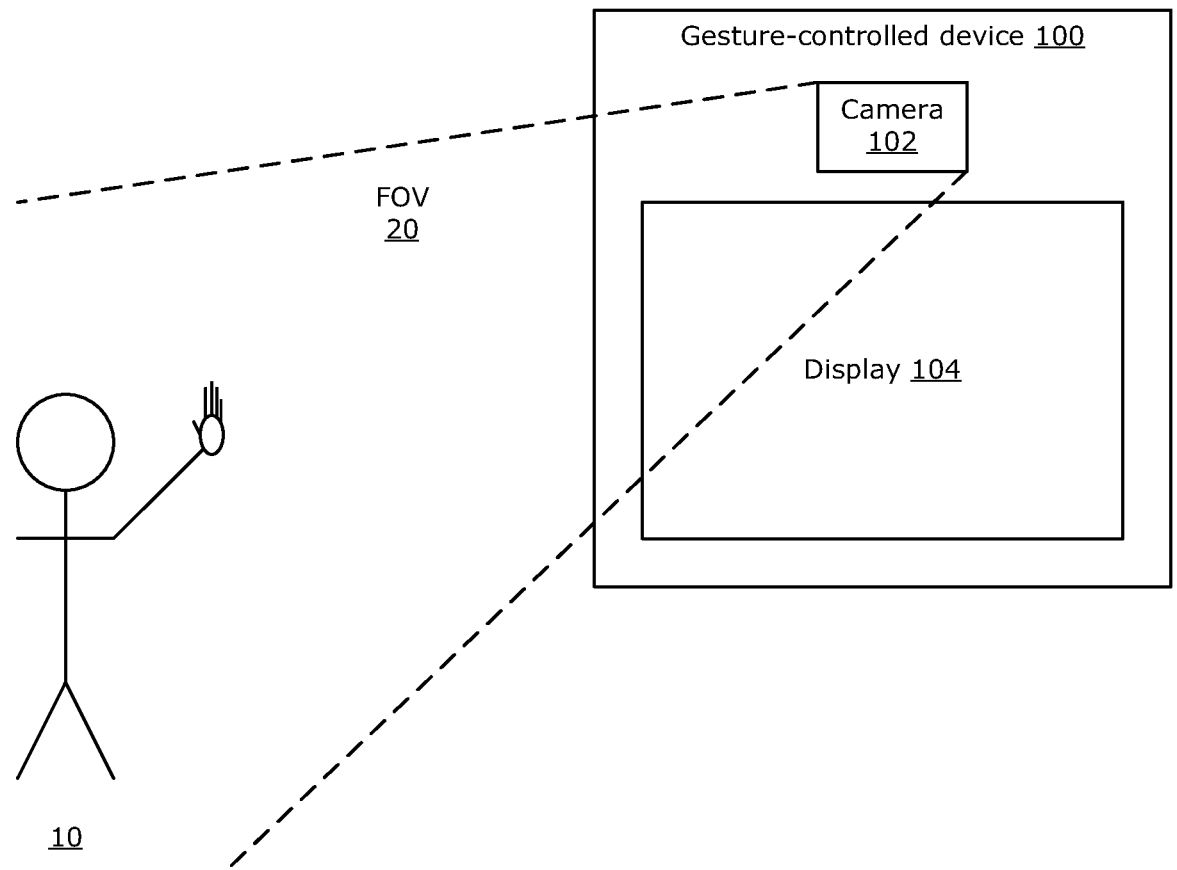
FIG. 1 is a block diagram illustrating a user interacting with an example gesture-controlled device.

FIG. 1 shows an example of a user 10 interacting with a gesture-controlled device 100. In this simplified diagram, the gesture-controlled device 100 includes a digital camera 102 that captures a field-of-view (FOV) 20. The FOV 20 may include at least a portion of the user 10, in particular a face and a hand of the user 10, as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may, instead of the digital camera 102, have another sensor capable of sensing mid-air gestures from the user 10, for example any image capturing device/sensor (e.g., an infrared image sensor). The gesture-controlled device 100 also includes a display device 104 (hereinafter referred to as display 104) for rendering visual information thereon, such as a video.

Figure 2:
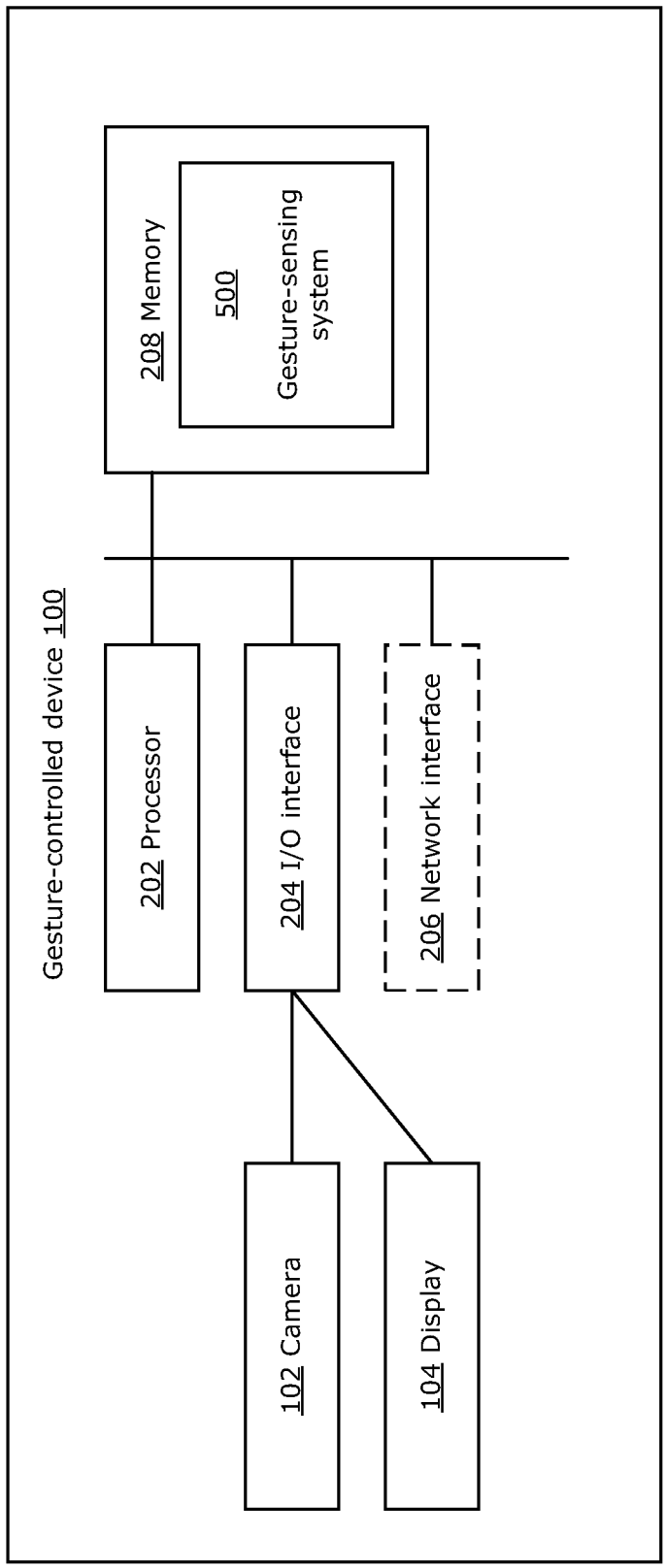
FIG. 2 is a block diagram illustrating some components of an example gesture-controlled device.

Referring to FIG. 2, a block diagram the gesture-controlled device 100 is shown. Although an example embodiment of the gesture-controlled device 100 are shown and discussed below, other embodiments may be used to implement examples disclosed herein, which may include components different from those shown. Although FIG. 2 shows a single instance of each component of the gesture-controlled device 100, there may be multiple instances of each component shown.

The gesture-controlled device 100 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device". The gesture-controlled device 100 also includes one or more input/output (I/O) interfaces 204, which interfaces input devices such as the digital camera 102 and output devices such as the display 104. The gesture-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing live gesture input as a sequence of video frames. The captured frames may be buffered by the I/O interface(s) 204 and provided to the processing device(s) 202 to be processed in real-time or near real-time (e.g., within 100 ms).

The gesture-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processor(s) 202, such as to carry out examples described in the present disclosure. A set of instruction defining a gesture-sensing system 500 are shown stored in the memory(ies) 208, which may be executed by the processor(s) 202 to perform the steps of the methods described below. The operation of the gesture-sending system 500 is described below with reference to FIG. 5. The gesture-sensing system 500 includes machine-executable instructions that are executable by the processor(s) 202 to perform the functions of each subsystem 516, 520, 522, 560, 562, 570 thereof. The memory(ies) 208 may include other software instructions, such as for implementing an operating system and other applications/functions.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with each other via a bus, for example.

In some embodiments, a distributed system may include multiple gesture-controlled devices 100 as well as optionally one or more additional components. The distributed system may include multiple gesture-controlled devices 100 in communication with each other over a network; for example, a videoconferencing system may comprise a gesture-controlled device 100 for each remotely participating user, with optionally a central server. Gesture recognition and classification, and prioritizing user gestures to control the videoconferencing application running on each gesture-controlled device 100, may be carried out through some combination of local processing (i.e. at each user's gesture controlled device 100) and remote or central processing (i.e. at a central server). In some embodiments, a first gesture-controlled device 100 may be configured to recognize and classify a mid-air gesture being performed by a local user, with a central server prioritizing gestures performed simultaneously by users of different gesture-controlled devices 100. In some embodiments, each gesture-controlled device 100 may send a collection of frames captured by the digital camera of the gesture-controlled device 100 to the central server, which prioritizes an order in which the collection of frames received from each gesture controlled-device are processed, and processes the collection frames received from each gesture-controlled device 100 to recognize and classify mid-air gestures performed by users of thee gesture-controlled device 100 in the order prioritize gesture controls collectively. In some embodiments, each gesture-controlled device 100 is configured to prioritize recognized and classified mid-air gestures based on a combination of locally-captured frames (e.g. frames captured by the digital camera of the gesture-control device 100) and information received from the other gesture-controlled devices 100 in the distributed system. In some embodiments, the distributed system is an augmented reality system that includes a single gesture-controlled device 100 and multiple digital cameras (e.g. a digital camera array positioned around a physical space) and/or multiple displays. In this embodiment, the single gesture-controlled device 100 is used to recognize and classify mid-air gestures in a collection of frames captured by the digital camera 102 of the gesture-controlled device 100, or in a collection of frames captured by multiple digital cameras of the system, and the gesture-controlled device uses the recognized and classified mid-air gesture to control the multiple displays to render information thereon. It will be appreciated that these systems are provided as examples, and that other distributed systems are possible.

It will be appreciated that different embodiments may include different combinations of input and output devices in place of, or in addition to, the digital camera 102 and display 104. In the context of a VR or AR system, multiple head-mounted displays may be used instead of a single large shared display 104, with one or more digital cameras 102 used to capture the video used for input as described herein. Feedback information presented to users of such a VR or AR system on each user's respective head-mounted display may be similar to the feedback described herein as being presented on a single shared display 104. In some embodiments, feedback information intended for a single user could be presented only on the targeted user's head-mounted display.

In some embodiments, multiple digital cameras 102 may be used to capture frames that include users' mid-air gestures. For example, a VR or AR system may include a separate digital camera mounted on each user's headset or other VR or AR device, with each respective digital camera of each user's headset or other VR or AR device used to capture a collection of frames that include that user's mid-air gestures. Similarly, and example videoconferencing, VR, or AR system with multiple users located remotely from each other could use digital cameras local to each user to capture images that include the user's body and environment in order to recognize and classify that user's mid-air gestures. In such an example multi-camera embodiment, the methods and systems described herein could be used to detect and track each user's hand and recognize and classify each user's mid-air gesture by combining the frames captured by each digital camera. This combination of frames from multiple digital cameras could be accomplished temporally in some embodiments (e.g. processing each frame for gesture classification sequentially), spatially in some embodiments (e.g. creating a composite frame encompassing the current frame received from each digital camera, and processing the composite frame for gesture classification), or by some other method of combining frames received from multiple digital cameras.

Example Gestures

To help in understanding the present disclosure, a discussion of gestures is first provided. In the present disclosure, a hand gesture is generally defined by one or more distinct hand shapes and/or hand movements that may be classified by the gesture-controlled device 100 as a particular command input. A hand gesture may have different hand shapes and hand movements. For example, hand shape may be classified by the gesture-controlled device 100 as belonging to one of the hand shape classes shown in FIGS. 3A-3H.

FIG. 3A illustrates an "open hand" shape 30; FIG. 3B illustrates a "fist" (or "closed hand") shape 32; FIG. 3C illustrates a "pinch open" shape 34; FIG. 3D illustrates a "pinch closed" shape 36; FIG. 3E illustrates a "mute" (or "silence") shape 38; FIG. 3F illustrates a "like" (or "approve") shape 40; FIG. 3G illustrates an "others" (or "next") shape 42; and FIG. 3H illustrates a "touch" (or "select") shape 44. Other hand shape classes may be classified by the gesture-controlled device 100.

Based on such hand shape classes, hand gestures may be classified as static or dynamic gestures. A static gesture is defined by a single hand shape class, and is held in a generally fixed location (e.g., within a defined area that allows for some margin of error) for at least a defined period of time (e.g., 1 second) or at least a defined number of consecutive captured frames (e.g., 100 frames) of a video that includes a user of the gesture-controlled device 100. For example, a static "open hand" gesture that includes multiple open hand shapes 30 at the same location in multiple frames may be recognized by the gesture-controlled device 100, and in the context of a video playback may be interpreted as a pause command input. A static "fist" gesture that includes multiple static fist shapes 32 at the same location in multiple frames may be recognized by the gesture-controlled device 100, and in the context of a video playback may be interpreted as a stop command input. A gesture may be recognized by the gesture-controlled device 100 and classified as a specific gesture type, such as an "open hand" static gesture or "fist" static gesture as described above.

A dynamic gesture is defined by a combination of one or more hand shape classes, locations, and/or movements. For example, a dynamic gesture may be a single hand shape class that changes in location over time (e.g., detected at different locations in a sequence of frames of a captured video). An open hand shape 30 that changes in location over time may be classified by the gesture-controlled device 100 as a dynamic open hand gesture and interpreted as a command to drag or move an interface object such as a displayed icon.

Figure 4A:
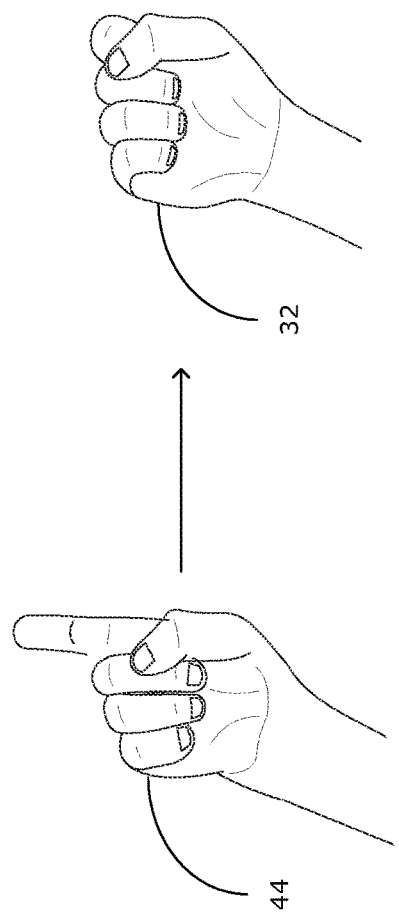
FIGS. 4A-4C illustrate some example dynamic gestures that may be detected and classified by an example gesture-controlled device.

FIG. 4A illustrates another type of dynamic gesture which may be a combination of hand shape classes. In FIG. 4A, the dynamic gesture includes a combination of the touch shape 44 followed by the fist shape 32. This dynamic gesture may be recognized by the gesture-controlled device 100 and interpreted as command inputs equivalent to using a mouse device to select and then click on an interface object. In another example, the pinch open shape 34 followed by the pinch closed shape 36 may together be classified as a "pinching" dynamic gesture, which may be recognized by the gesture-controlled device 100 and interpreted as a zoom out command input. As in the case of static gestures, a dynamic gesture may be recognized by the gesture-controlled device 100 and classified as a specific gesture type, such as the dynamic gesture shown in FIG. 4A.

More complex dynamic hand gestures may involve both combination of hand shape classes as well as changes in location. For example, in FIG. 4A, if the touch shape 44 is detected as changing in location over time (e.g., detected in different locations over a sequence of frames of a video of a user of the gesture-controlled device 100) and followed by the fist shape 32, the gesture-controlled device 100 may interpret this complex dynamic gesture as a command to move a displayed cursor in a way that mirrors the change in location of the touch shape 44 followed by a click command when the fist shape 32 is detected.

Figure 4C:
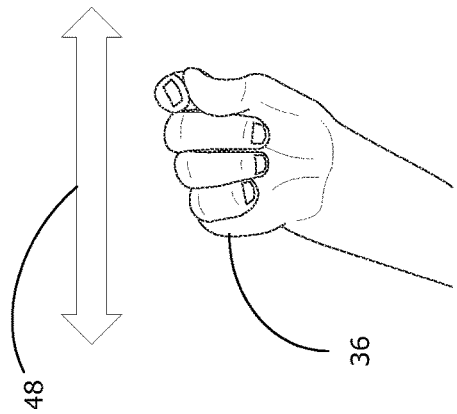
Figure 4B:
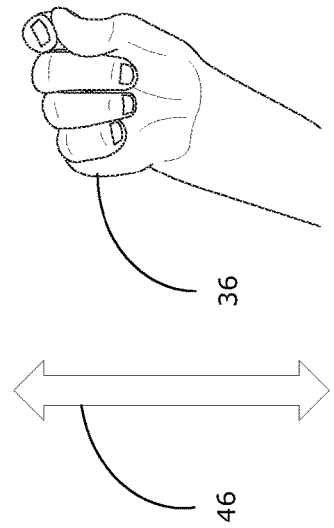

In another example, the pinch open shape 36, followed by the pinch closed shape 38, followed by a change in location of the pinch closed shape 38, and followed by the pinch open shape 36 again may together be classified by the gesture-controlled device 100 as a dynamic "pinch-drag-release" hand gesture. It should be noted that dynamic hand gestures that include changes in location may be interpreted as different inputs depending on the particular change in location. For example, a pinch-drag-release hand gesture with a vertical change in location 46 (or a vertical "drag") of the pinch closed hand 38, as shown in FIG. 4B, may be interpreted in the context of a video playback as a command input to change the volume. In contrast, a pinch-drag-release hand gesture with a horizontal change in location 48 of the pinch closed hand shape 38, as shown in FIG. 4C, may be interpreted in the context of a video playback as a command input to move forward or backward in the video. Such a pinch-drag-release dynamic hand gesture may provide an intuitive and convenient way for a user to interact with the gesture-controlled device 100, and may also enable the complex dynamic gesture to be classified by the gesture-controlled device 100 with relatively high accuracy. In particular, the pinch-drag-release dynamic hand gesture may be detected and classified by breaking down the dynamic hand gesture into its constituent hand shape classes (e.g., pinch open shape 36, followed by pinch closed hand shape 38, followed by another pinch open hand shape 36).

The location of a hand, and changes in that location (such as vertical or horizontal changes of location) over time may be detected and interpreted by the hand detection and tracking subsystem 516 as described below. The location of a hand may be defined in different ways in different examples. In some examples, the location of a hand may be defined with respect to the FOV of the camera of the gesture-controlled device 100. Thus, in some examples the location of the hand within a video frame (e.g., the pixel locations of the hand) may be mapped directly to a vertical and horizontal location relative to the FOV of the camera, and changes in the location of the hand within subsequent frames may be interpreted as corresponding changes to the location of the hand (i.e. movement of the hand). In other examples, the location of the hand may be defined relative to another object in the frame, such that the location of the hand in a given frame is defined relative to the location of the object within the given frame. In such examples, axes defining the location or movement of the hand (such as horizontal and vertical axes) may be defined relative to the location and/or orientation of the other object. In some examples, such as examples with a non-stationary camera, the camera may use other data (such as camera location and/or orientation data) to define the axes and therefore the location and movement of the hand. One example configuration for a gesture-sensing device 100 defines the location of a hand in a frame and the movement of the hand across a series of frames with respect to a vertical plane, wherein the vertical plane is defined relative to a horizontal ground. The horizontal ground may be detected within the camera FOV and used to define the vertical plane in some examples. In other examples, the camera is oriented substantially horizontally such that the FOV (and therefore the 2D image of the frame) corresponds substantially to a vertical plane, wherein the X and Y pixel coordinates of each pixel of the frame corresponds to light projected from a corresponding X-Y coordinate of the vertical plane.

Example Gesture Sensing System

Figure 5:
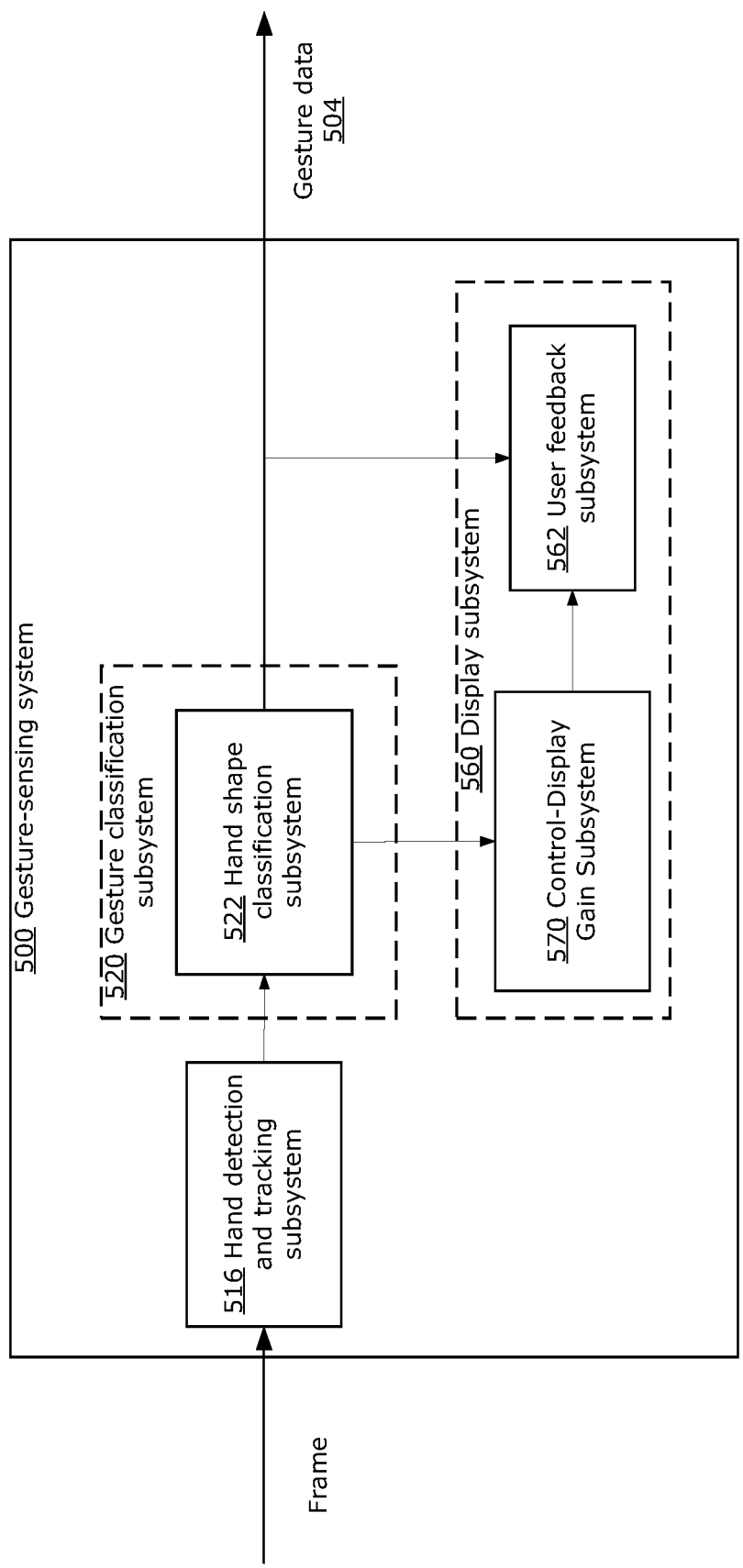
FIG. 5 is a block diagram illustrating some details of an example gesture-sensing system that may be implemented in the example gesture-controlled device of FIG. 2.

FIG. 5 is a block diagram illustrating an example of gesture-sensing system 500 of the gesture-controlled device 100. In this example, the gesture-sensing system 500 includes a hand detection and tracking subsystem 516 and a gesture classification subsystem 520. In the following examples, the gesture-sensing system 500 will be described as including several subsystems or providing the functions of several subsystems. However, in other examples, the gesture-sensing system 500 may include (or provide the functions of) only a subset of the described subsystems.

In some examples, the gesture-sensing system 500 may not include distinct subsystems. Instead, the subsystems 516, 520, 560, 570 may be considered sub-blocks of the gesture-sensing system 500 itself. Thus, the implementation of the gesture-sensing system 500 using distinct subsystems 516, 520 is optional.

The gesture-sensing system 500 includes a hand shape classification subsystem 522. The hand shape classification subsystem 522 may be part of the gesture classification subsystem 520.

A frame of a captured video is received from the camera and input to the gesture-sensing system 500. The hand detection and tracking subsystem 516 processes the frame to detect a hand in the frame, defines a bounding box for the detected hand, crops the frame to generate a cropped frame that includes only a region of the frame that corresponds to the defined bounding box of the frame, and outputs the cropped frame. The hand detection and tracking subsystem 516 may use any suitable hand detection technique to process the frame to detect a hand in the frame, define a 2D or 3D bounding box for the detected hand, and crop the frame.

In some examples, the hand detection and tracking subsystem 516 may include a trained neural network constructed and arranged for performing hand detection and tracking. For example, a suitable neural network for hand detection and tracking may be the YoloV5 (e.g., as described in Redmon et al. "Yolov5: An incremental improvement," arXiv preprint arXiv:1804.02767, 2018) based on a residual neural network (ResNet) architecture such as ResNet54 (e.g., as described in He, Kaiming, et al. "Deep residual learning for image recognition." Proceedings of the IEEE conference on computer vision and pattern recognition. 2016). Other examples of a trained neural network constructed and arranged for performing hand detection and tracking may be a trained single shot detector (SSD) such as multibox SSD (e.g., as described in Liu et al. "Ssd: Single shot multibox detector." European conference on computer vision. Springer, Cham, 2016), or a trained convolutional neural network (CNN) such as MobileNetV2 (e.g., as described in Sandler et al. "Mobilenetv2: Inverted residuals and linear bottlenecks." Proceedings of the IEEE Conference on Computer Vision and Pattern Recognition. 2018). Hand detection and tracking may also be performed by the hand detection and tracking subsystem 516 using the Lucas-Kanade optical flow technique (as described in Lucas et al. "An iterative image registration technique with an application to stereo vision." Proceedings of Imaging Understanding Workshop, 1981).

The cropped frame that includes only the region of the frame that corresponds to bounding box defined for the detected hand is used by the hand shape classification subsystem 522 to perform identification and classification of a hand shape in the cropped frame as a hand shape class. The hand shape classification subsystem 522 may use any suitable classification technique to process the cropped frame to classify the shape of the detected hand as a particular hand shape class. For example, the hand shape classification subsystem 522 may include a trained neural network (e.g., a CNN) that has been trained to classify a hand shape according to a predefined set of hand shape classes. The identified hand shape class may be outputted (e.g., as a label) from the hand shape classification subsystem 522.

The gesture classification subsystem 520 may use the hand shape class outputted by the hand shape classification subsystem 522, the hand location data outputted by the hand detection and tracking subsystem 516, and additional hand location and/or hand shape data from one or more previous frames to determine that the hand is performing a static or dynamic gesture and to classify that gesture. As described above, a single hand shape class (e.g. an "open hand" shape 30) detected in substantially the same location within multiple consecutive frames (e.g., 100 frames) may be classified as a static gesture type (e.g., an "open hand" static gesture type) by the gesture classification subsystem 520. Similarly, a hand shape class performed in different location in a sequence of frames, or multiple hand shape classes performed in sequence across a sequence of frames, may be classified by the gesture classification subsystem 520 as a dynamic gesture type (e.g., a pinch-drag-release dynamic hand gesture type). The gesture classification subsystem 520 may generate gesture data 504 in response to recognizing and classifying a gesture, including the classified gesture type of the gesture as well as a duration of time over which the gesture has been performed. In some examples, the gesture data 504 may be generated and outputted even when no gesture has been recognized, and the gesture data may include data generated by the hand detection and tracking subsystem 516 and/or the hand shape classification subsystem 522. For example, in some embodiments the gesture data 504 may include hand location data (e.g., absolute location within the frame, location relative to the steering wheel, and/or hand bounding box coordinates), hand movement data, and/or hand location history data (indicating the location of the hand in one more previous frames) generated by the hand detection and tracking subsystem 516. In some embodiments, the gesture data 504 may include an identified hand shape class recognized in the current frame, and hand shape history data (e.g. based on a queue of stored past identified hand shape classes) generated by the hand shape classification subsystem 522. The gesture data 504 may also include gesture type data indicating the current gesture type being performed by the hand, and/or gesture duration data, generated by the gesture classification subsystem 520.

A software application (e.g., an operating system) of the gesture-controlled device 100 may translate the gesture type outputted by the gesture-sensing system 500 into a command input. The translation of the gesture type into the command input may be application-dependent. For example, a given gesture type may be translated into a first command input when a first application is active, but may be translated into a second command input (or may be considered invalid) when a second application is active.

The gesture-sensing system 500 also includes a display subsystem 560 which includes a user feedback system 562 and a control-display gain subsystem 570. The operations of the user feedback system 562 and control-display gain subsystem 570 are described in detail below.

Although the gesture-sensing system 500 is illustrated as having different sub-blocks (or subsystems), it should be understood that this is not intended to be limiting. For example, the adaptive gesture-sensing system 500 may be implemented using greater or fewer numbers of sub-blocks (or subsystems), or may not require any sub-blocks (or subsystems). Further, functions described herein as being performed by a particular sub-block (or subsystem) may instead be performed by another sub-block (or subsystem).

Generally, the functions of the gesture-sensing system 500 may be implemented in various suitable ways and remain within the scope of the present disclosure.

Figure 6:
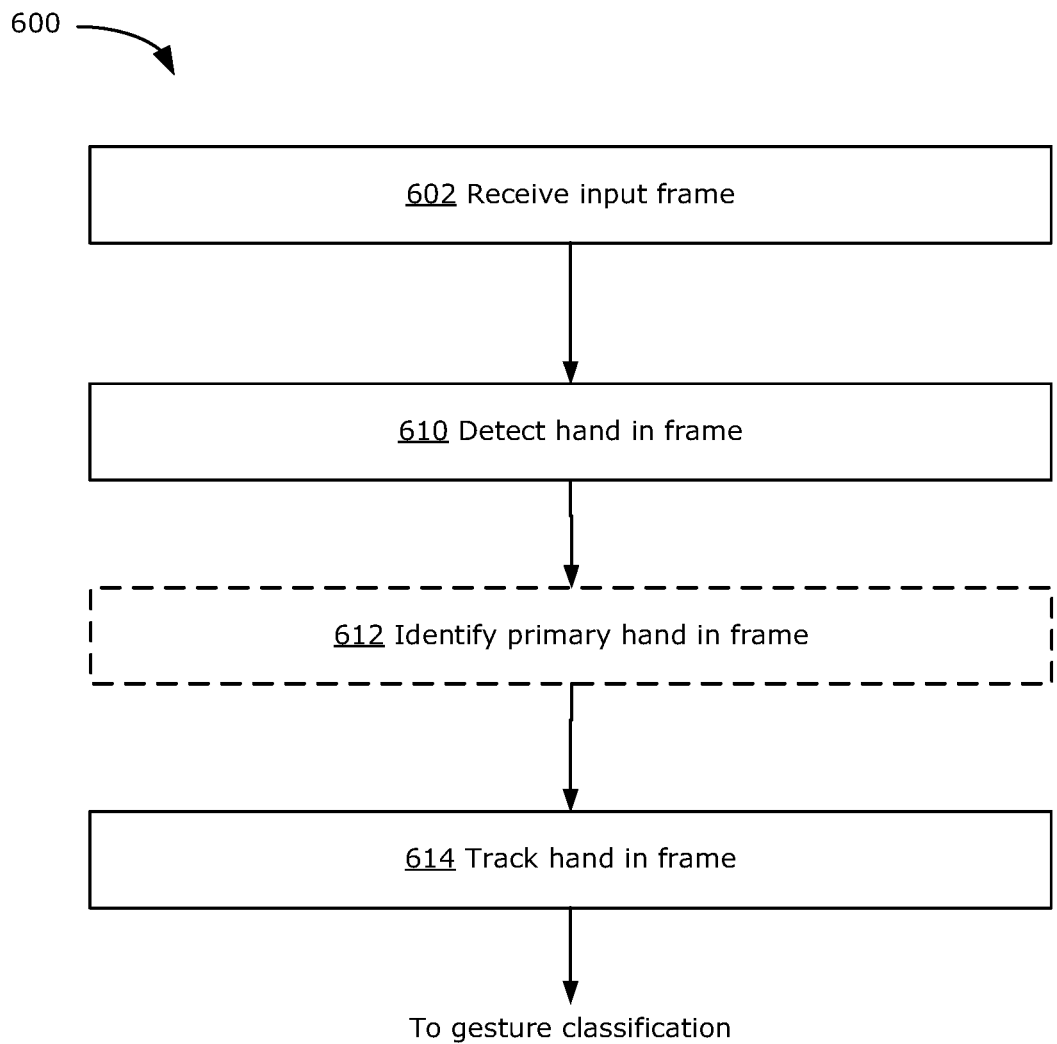
FIG. 6 is a flowchart illustrating an example hand detection and tracking method that may be performed by the gesture-sensing system of FIG. 5.

FIG. 6 is a flowchart illustrating an example hand detection and tracking method 600 that may be performed by the gesture-sensing system 500, for example using the hand detection and tracking subsystem 516.

At 602, an input frame is received. Generally, the input video frame is received one at a time, in real-time or near real-time. The input frame may be the raw, unprocessed data captured by the camera 102, or may be minimally processed (e.g., normalized).

At 610, a hand is detected in the input frame. If no hand is detected in the input frame, it may be determined that there is no gesture input found in the received input frame, and the method 600 may return to step 602 to receive the next input frame. Assuming that at least one hand is detected in the input frame, the method 600 proceeds to optional step 612.

Optionally, at 612, if more than one hand is detected in the input frame, one primary hand may be identified in the input frame. A primary hand may be identified based on, for example, the largest detected hand in the input frame or some other criterion. If there is only one hand detected in an input frame, it may be assumed that the one hand is the primary hand.

At 614, the detected hand (or primary hand) is tracked in the input frame (e.g., using the hand detection and tracking subsystem 516). Information from detecting and tracking the hand (or primary hand) is provided for further parsing of the gesture. For example, a bounding box and optional identifier may be generated in order to track the detected hand. The bounding box (and optional identifier) may then be provided (e.g., to the gesture recognition subsystem 522, or other hand classifier) to analyze and parse the cropped frame consisting of the pixels of the frame within the bounding box, e.g., to recognize and classify a hand shape within the cropped frame.

In some examples, the hand detection and tracking method 600 may be implemented by the gesture-sensing system 500 using only the hand detection and tracking subsystem 516. Instead of outputting gesture data 504 as described above, the gesture-sensing system 500 may output information about the tracked hand (e.g., the bounding box) to a conventional video-based hand gesture recognition system, and the conventional gesture recognition system may perform the hand classification and gesture recognition.

In some examples, the hand tracking method 600 may be used to process every video frame captured by the camera 102. In other examples, the hand tracking method 600 may only be used when a gesture input is expected. For example, the hand tracking method 600 may be initiated in response to a command input (e.g., via keyboard input, mouse input or voice input). In some examples, the hand tracking method 600 may be initiated based on detection of human attention. For example, an attention detection technique (e.g., using eye-tracking software) may be used to determine whether a human is looking directly at the gesture-controlled device 100, and the hand tracking method 600 may be initiated only when a direct human gaze at the device 100 is detected. It may be useful to initiate the hand tracking method 600 in response to detected human attention, to avoid false positives or incorrect interpretation of gesture input.

Figure 7:
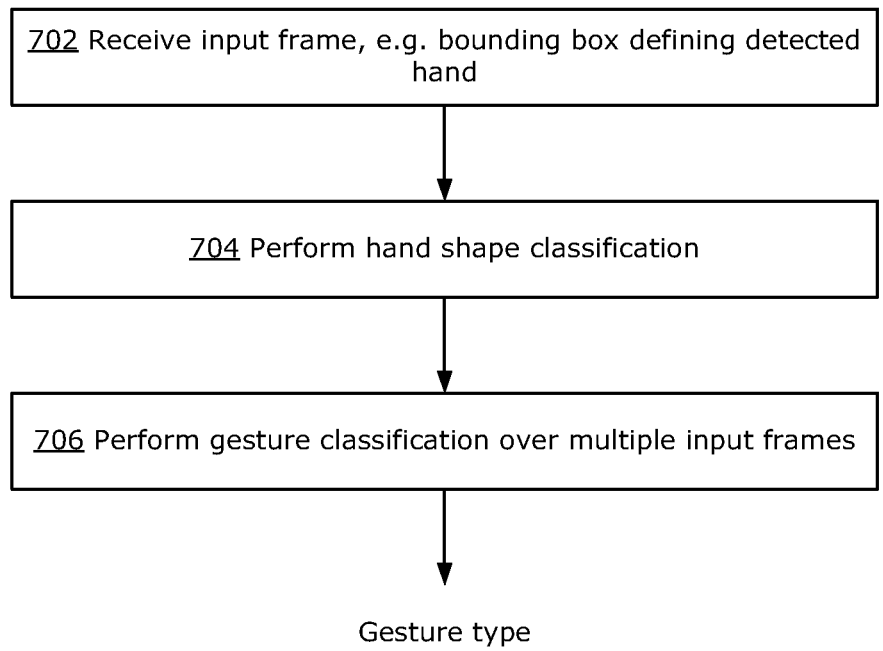
FIG. 7 is a flowchart illustrating an example gesture classification method using bounding box refinement based on a hand detected and tracked by the method of FIG. 6.

FIG. 7 is a flowchart illustrating an example gesture classification method 700 using bounding box refinement for performing gesture classification. The gesture classification method 700 may be implemented by the gesture classification subsystem 520.

At 702, a frame is received, such as a cropped frame consisting of the pixels inside a bounding box defining the detected hand (e.g., outputted by the hand detection and tracking subsystem 516).

At 704, the hand shape classification subsystem 522 may be used to perform hand shape classification.

At 706, gesture classification is performed over multiple input frames. For example, the gesture classification subsystem 520 may store a buffer of previous input frames and perform gesture analysis by considering the hand shape class detected and classified for one or more previous input frames. The hand shape class detected and classified in the current frame and the one or more previous frames, as well as hand location data in the current frame and the one or more previous frames, may be used by the gesture classification subsystem 520 to recognize and classify a static or dynamic gesture as described above.

A buffer (e.g., implemented in the gesture-sensing system 500) may be used to store a predetermined number of previous input frames. The number of previous input frames that are stored in the buffer may be relatively small (e.g., 10-30 previous input frames) in some embodiments, for more efficient use of memory resources. In some examples, the buffer may additionally or alternatively store the results of the gesture classification performed on the previous input frames.

For a single static gesture to be recognized, the gesture recognition subsystem 522 may require that the same hand shape class be detected a predefined minimum number of times (K) over a predefined number of previous input frames (N), where K≥1 and K≤N. This requirement may help to improve detection accuracy and reduce false positives. In some examples, the same hand shape class may need to be detected over K consecutive input frames over N previous input frames. The predefined minimum K may be selected to be a relatively small number (e.g., 10) to enable better detection and still achieve near real-time gesture recognition. Static gestures that may be recognized and classified using this approach may include, for example, a mute gesture consisting of at least K mute hand shapes 38 over the previous N frames (e.g., for mute or unmute commands) or the static open hand gesture consisting of at least K open hand shapes 30 over the previous N frames (e.g., for play or pause commands). The N previous input frames may be stored in the buffer, and may be used as a sliding window for detecting gestures, to help reduce false positives. Gesture data 504 may indicate a previous number of frames in which the hand shape class is detected in some embodiments.

A dynamic gesture may be recognized by the gesture recognition subsystem 522 based on a combination of two or more static gestures. For example, a complete dynamic gesture may be decoupled into different states, where transition between states is the result of detection of a static gesture. The gesture recognition subsystem 522 may implement a set of predefined state transition rules, for state-based recognition of dynamic gestures.

Figure 8:
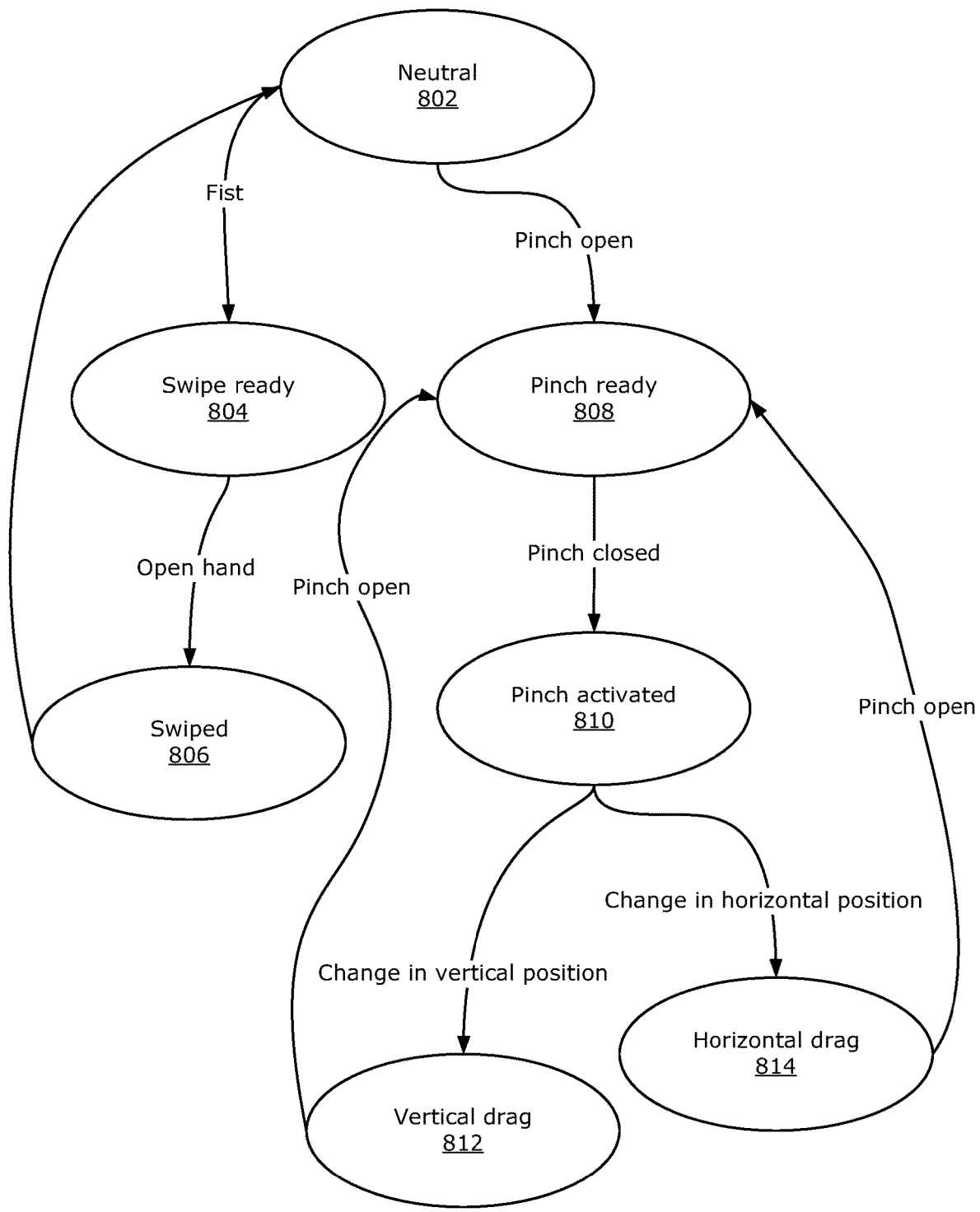
FIG. 8 is a state diagram illustrating an example of state-based gesture classification.

FIG. 8 is a state diagram illustrating an example of state-based recognition of dynamic gestures, which may be implemented by the gesture recognition subsystem 522. The neutral state 802 may be initial state by default when gesture input is first activated, or when a current valid gesture is not detected.

A swipe dynamic gesture may be detected when a fist gesture 32 is first detected to transition to the swipe ready state 804, followed by detection of an open hand gesture 30 to transition to the swiped state 806. Upon reaching the swiped state 806, the gesture recognition subsystem 322 recognizes the gesture input as a dynamic swipe gesture. Thus, the recognition of the static fist gesture 32 followed by the static open hand gesture 30 (in proper order) results in the recognition of the dynamic swipe gesture. Further, a change in location between the detected fist gesture 32 and the detected open hand gesture 30 may be required to positively detect a dynamic swipe gesture (e.g., in order to distinguish the swipe gesture from another dynamic gesture that does not involve a change in location). A change in location of a detected gesture may be calculated based on a change in the coordinates of the hand bounding box. Upon reaching the swiped state 806, the gesture classification subsystem 520 may generate an output indicating the recognized hand gesture (e.g., a gesture type label) and may further generate output indicating the change in location between the detection of the swipe ready state 804 and the swiped state 806. These outputs may be included in the gesture data 504.

A vertical or horizontal dynamic drag gesture (also called a dragging hand gesture) may be detected as a combination of pinch open 34, pinch closed 36 and pinch open 34 static gestures. For example, from the neutral state 802, a transition to a pinch ready state 808 occurs after detection of the pinch open static gesture 34. From the pinch ready state 808, detection of the pinch closed static gesture 36 causes a transition to the pinch activated state 810. From the pinch activated state 810 and staying in the pinch closed static gesture, 36 a change in vertical location (e.g., a change that is greater than a predefined threshold) causes a transition to the vertical drag state 812. Similarly, from the pinch activated state 810 and staying in the pinch closed static gesture, a change in horizontal location (e.g., a change that is greater than a predefined threshold) causes a transition to the horizontal drag state 814). If the change in location is a combination of vertical and horizontal changes (e.g., a diagonal change in location), the change that is greater in magnitude may be used for determining the state transition. Alternatively, if the change in location is a combination of vertical and horizontal changes, there may not be a state transition recognized. Upon reaching the vertical drag state 812 or the horizontal drag state 814, the gesture classification subsystem 520 may generate an output (e.g. as part of the gesture data 504) indicating the recognized gesture (e.g., gesture type label) and may further provide output indicating the change in vertical or horizontal location. For example, the gesture classification subsystem 520 may compute the distance (e.g., based on coordinates defined in the input frame) and output this value. The distance value may be used to map the dynamic drag gesture to a drag command input. From the vertical drag state 812 or the horizontal drag state 814, detection of the pinch open static gesture causes a transition to the pinch ready state 808. Return to the pinch ready state 808 may be recognized as the end of the dynamic drag gesture.

Thus, in some embodiments the hand is considered to be performing a dragging hand gesture beginning at a frame that shows the end of a transition from the first pinch open gesture 34 to the pinch closed gesture 36, and ending at a frame that shows the end of a transition from the pinch closed gesture 36 to the second pinch open gesture 34. This detection of a dynamic drag gesture is performed over multiple input frames, as described at step 706 of method 700 above.

In other embodiments, a single static hand gesture may trigger the gesture-controlled device 100 to enter a drag state, and the drag state ends when the hand is no longer performing the static hand gesture. Thus, for example, recognition of a pinch closed gesture 36 may cause the device to enter a drag state regardless of whether the pinch closed gesture 36 is preceded by a pinch open gesture 34. In some such embodiments, the device may only enter the drag state if the static gesture is performed in a particular way, e.g., within a specific region of the frame or held for a specific period of time. In embodiments using a static gesture to trigger a drag state, the hand may be considered to be performing a dragging hand gesture during any frame in which the hand is performing the specified static gesture.

For dynamic gestures that involve a change in location, the gesture classification subsystem 520 may implement predefined rules based on laws of physics and/or expected human motion, to further exclude possible false positives. For example, a predefined rule may be that a detected hand should not exhibit a change in location that is greater than a predefined threshold (e.g., a change of more than 100 pixels) between consecutive input frames.

Using state-based gesture recognition may be advantageous over motion-based gesture segmentation and recognition. For example, significantly higher processing resources may be required to detect and process gesture motion, compared to detecting static gestures. Further, state-based gesture recognition may be less prone to false positives.

Example Methods for Velocity-Based Control-Display Gain Adjustment

Figure 9:
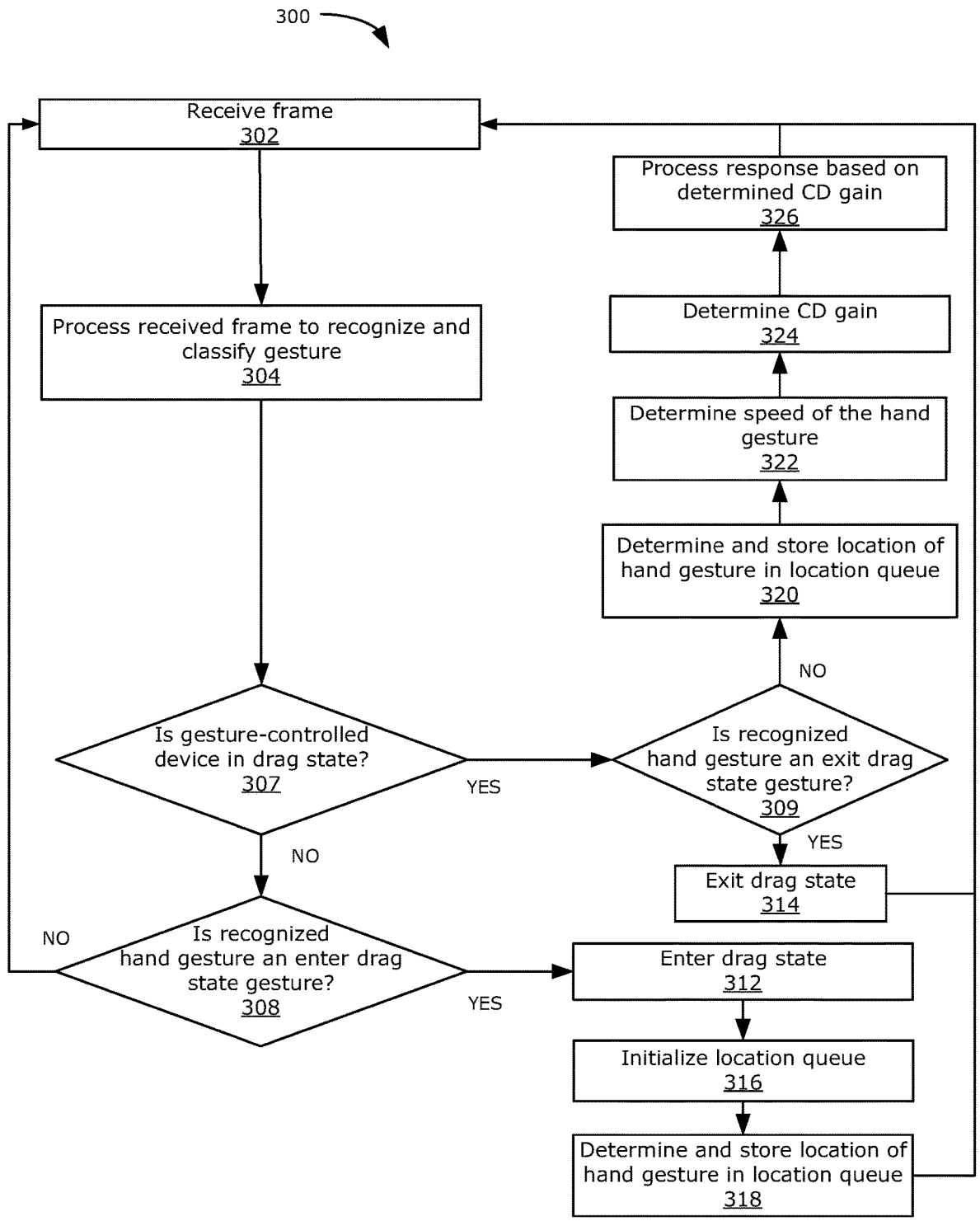
FIG. 9 is a flowchart illustrating a velocity-based method for adjusting the control-display gain of the gesture-controlled device of FIG. 2.

Referring to FIG. 9, a velocity-based method 300 is shown for adjusting the control-display gain of the gesture-controlled device 100. By adjusting the control-display gain of the gesture-controlled device 100, the method 300 may facilitate user interaction with content or UI elements rendered on a display screen 104 of the gesture-controlled electronic 100. The method 300 may be implemented in software (i.e. instructions stored in memory 208) that is executed by processor 202. In some embodiments, as described below, the method 300 is performed by the gesture-sensing system 500. The method 300 may include additional or fewer actions than shown and described, and may be performed in a different order. Computer-readable code or instructions of the software that implements the method 300, when executed by the processor 202 of the gesture controlled device 100, may be stored in the memory 208 or a processor-readable medium. It will be appreciated that reference may be made herein to various properties of a hand gesture (e.g., location, velocity, speed, or orientation of a gesture), and that these references shall have the same meaning as references to the properties of a hand performing the hand gesture.

The method 300 begins at step 302. At step 302, a frame of a video captured by the digital camera 102 is received by the gesture-sensing system 500. The method 300 then proceeds to step 304. At 304, the received frame is processed (e.g., by the gesture-sensing system 500) to recognize and classify a hand gesture being performed by the user's hand within the frame. In some examples, step 304 may be performed by the gesture-sensing system 500 by detecting and tracking a hand in accordance with hand detection and tracking method 600 followed by recognizing and classifying a hand gesture in accordance with gesture classification method 700. In this example, the gesture recognized at step 304 is a static gesture being performed by user of the gesture-controlled device 100 in the current frame, i.e. a static hand shape that is being performed in the current frame and has been performed in at least K of the previous N frames prior to the current frame.

At step 307, the gesture-sensing system 500 determines whether the gesture-controlled device 100 is in a drag state, as described above with reference to FIG. 8. If, at step 307, the gesture-sensing system 500 determines that the gesture-controlled device 100 is in the drag state (e.g., horizontal drag 814 or vertical drag 812), the method 300 proceeds to step 312. If, at step 307, the processor 202 determines that the gesture-controlled device 100 is not in the drag state, the method 300 proceeds to step 309.

At step 308, the gesture classification subsystem 520 determines whether an "enter drag state" gesture has been performed. In this example, as in FIG. 8 described above, a drag state may be entered by performing a pinch open gesture 34 followed by a pinch closed gesture 36. Thus, in this example, a dynamic gesture consisting of pinch open 34 to pinch closed 36 constitutes an "enter drag state" gesture. It will be appreciated that other static or dynamic gestures may be recognized as "enter drag state" gestures in different embodiments. If, at step 308, the gesture classification subsystem 520 determines that an "enter drag state" gesture has been performed, the method 300 proceeds to step 312. If, at step 308, the gesture classification subsystem 520 determines that an "enter drag state" gesture has not been performed, the method 300 proceeds to step 310.

At step 312, the gesture-controlled device 100 enters a drag state. The method 300 then proceeds to step 316.

At step 316, a location queue of size k is initialized. The method 300 then returns to step 302, where a subsequent frame of the video captured by the digital camera 102 is received and step 304 is performed on the subsequent frame.

At step 318, a location of the recognized dragging hand gesture in the frame is determined and the location of the detected dragging gesture is stored in the location queue of size k. The method 300 then returns to step 302 to receive the next frame.

At step 309, the gesture classification subsystem 520 determines whether an "exit drag state" gesture has been performed. In this example, as in FIG. 8 described above, a current drag state of the gesture-controlled device 100 may be exited by performing a pinch closed gesture 36 (i.e. the gesture being performed while in the drag state) followed by a pinch open gesture 34. Thus, in this example, a dynamic gesture consisting of pinch closed 36 to pinch open 34 constitutes an "exit drag state" gesture. It will be appreciated that other static or dynamic gestures may be recognized as "exit drag state" gestures in different embodiments. If, at step 309, the gesture classification subsystem 520 determines that an "exit drag state" gesture has been performed, the method 300 proceeds to step 314. If, at step 309, the gesture classification subsystem 520 determines that an "exit drag state" gesture has not been performed, the method 300 proceeds to step 320.

Thus, in this example the hand performing the mid-air gesture will be determined by the gesture-sensing system 500 to be performing a dragging hand gesture beginning with the frame in which the transition from the first pinch open 34 to pinch closed 36 is completed, and ending with the frame in which the transition from pinch closed 36 to the second pinch open 34 is completed.

At step 314, gesture-controlled device 100 exits the drag state. The method 300 then returns to step 302 to receive the next frame of the video captured by the digital camera 102.

At step 320, a location of the detected recognized dragging hand gesture in the frame is determined and the location of the detected dragging gesture is stored in the queue of size k. The method 300 then proceeds to step 322. At step 322, the velocity (v) of the detected hand gesture is determined based on each location of the detected hand gesture stored in the location queue. The method 300 then proceeds to step 324.

The velocity of the dragging hand gesture is determined using a plurality of locations of the dragging hand gesture stored in the queue. This calculation may be performed by, e.g., the control-display gain subsystem 570. In an embodiment, the velocity v of the dragging hand gesture may be determined using the formula $$= \frac{p_1 - p_2}{t},$$

wherein $p_1$ is a first location of the dragging hand gesture stored in the queue at time $t_1$, $p_2$ is a second location of the dragging hand gesture stored in the queue at time $t_2$, and t is the time between two adjacent frames captured by the digital camera 102 at $t_1$ and $t_2$ (i.e., t is dependent on the frame rate used by the digital camera 102 to capture images of the user performing a mid-air gesture). In another embodiment, the velocity v of the dragging hand gesture may be determined using the formula $$= \frac{p_1 - p_3}{2t},$$

wherein $p_1$ is a first location of the dragging hand gesture stored in the queue at time $t_1$, $p_3$ is a third location of the dragging hand gesture stored in the queue at time $t_3$, and 2t is the time between the frames captured by the digital camera 102 at times $t_1$ and $t_3$ (i.e., the frames at $t_1$ and $t_3$ are separated by an intermediate frame at $t_2$). Any similar smoothing function may be used to interpolate a hand velocity between any two or more input frames.

In still another embodiment, the velocity v of the dragging hand gesture may be determined by determining two velocities $v_1$ and $v_2$ for dragging hand gesture using the formulas $$v_1 = \frac{p_1 - p_2}{t} \text{ and } v_2 = \frac{p_2 - p_3}{t}$$

and averaging v1 and v2 to obtain v, where $p_1$ is first location of the dragging hand gesture stored in the queue at time $t_1$, $p_2$ is a second location of the dragging hand gesture stored in the queue at time $t_2$, and $p_3$ is a third location of the dragging hand gesture stored in the queue at time $t_3$ and t is the time between two frames captured by the digital camera 102.

In still another embodiment, the velocity of the hand gesture may be determined by determining two velocities, $v_1$ and $v_2$ for dragging hand gesture using the formulas $$v_1 = \frac{p_1 - p_2}{t} \text{ and } v_2 = \frac{p_2 - p_3}{t}$$

and determining the acceleration of the dragging hand gesture determined using the formula $$a = \frac{v_1 - v_2}{t},$$

and determining the velocity v based on the determined acceleration using the formula v=$v_2$+(t*a).

In some embodiments, the determined velocity may be flattened from a vector value (i.e. a magnitude and direction of velocity) into a scalar speed value. In some embodiments, the speed value is the magnitude of the velocity vector. In other embodiments, the speed value is determined with respect to a predetermined direction or axis of the dragging gesture. For example, if the dragging gesture being performed involves horizontal dragging movement of the hand, then the speed of the user's hand may be computed as the scalar projection of the hand velocity vector onto a horizontal dragging axis. Thus, if the user's hand is moving in a direction that is at angle Θ to the horizontal, then the speed value computed at step 322 is equal to the magnitude of the hand velocity times |cos Θ|. Computations herein using a scalar value that refer to velocity (or v) shall be understood to be using a scalar speed value computed as described directly above.

At step 324, the control-display gain subsystem 570 determines the CD gain for the gesture-controlled device 100. The CD gain is determined at step 324 using a linear function. In this embodiment, the CD gain=$f(v)=c \times |v|$, where c is a pre-defined constant and v is the determined speed of the recognized hand gesture determined at step 324. The pre-defined constant is defined using a number of different parameters related to dragging hand gesture, including accuracy, time taken to perform a dragging hand gesture, dragging control efficiency, etc.

Alternatively, the CD gain is determined at step 324 using a generalized logistic function. In this embodiment, the CD gain $$\text{value} = f = A + \frac{K-A}{\left(C + Qe^{-B(v-M)}\right)^{\frac{1}{W}}},$$

where K is a maximum value for the CD gain, B is a logistic growth rate, W affects the growth of the CD gain value near either the lower bound or the upper bound of the function f(v), A determines the lower bound velocity gain, Q is dependent on the value of f(v=0), M indicates the starting velocity of the CD gain growth, and C affects the curve intensity of the CD gain, which is often set to 1. After the CD gain is determined at step 324, the method 300 proceeds to step 326. At step 326, the CD gain subsystem 570 adjusts a CD gain of the gesture-controlled device 100 to the CD gain determined at step 324 and a pointer, cursor, or progress bar rendered on the display 104 of the gesture-controlled device 100 is controlled using the adjusted CD gain. In some embodiments, visual, auditory, or other modalities of feedback may be presented to the user of the gesture-controlled device 100 to indicate the CD gain adjustment or current CD gain level. Examples of feedback will be described below with reference to FIGS. 11-14.

Thus, method 300 automatically adjusts the CD gain based on the determined velocity of a dragging hand gesture performed by a user. The faster the dragging hand gesture is performed by a user of the gesture-controlled device 100, the coarser the CD gain is for controlling content or UI elements (e.g., widgets) rendered on a display screen 104 of the gesture-controlled device 100. Further, method 300 simplifies the adjustment of the CD gain of the gesture-controlled device 100 by avoiding a user of the gesture-controlled device 100 having to navigate multiple menus to adjust the CD gain of the gesture-controlled device 100. In some embodiments, the control-display gain subsystem 570 determines a value for the CD gain at step 324 and the control-display gain subsystem 570 adjusts the CD gain of the gesture-controlled device 100 to the value for the CD gain determined at step 324.

It will be appreciated that the steps of method 300 shown in FIG. 9 could potentially be performed by a number of variant methods for adjusting the control-display gain of the gesture-controlled device 100 based on a property of a hand performing the dragging hand gesture, wherein the property may include hand velocity, hand location, hand orientation, or another property. In some embodiments, these methods may use the gesture-sensing system 500 to process a frame to detect a location and shape of a hand in the frame, generate gesture data for the frame based on the location and shape of the hand, determine that the hand is performing a gesture based on gesture data for the frame and gesture data for one or more previous frames, determine that the gesture is a dragging hand gesture (as in step 304), process a frame to detect a mid-air hand gesture in the frame (as in step 304), determine that the mid-air hand gesture is a dragging hand gesture (as in step 306), identify a property of the hand performing the dragging hand gesture (which may vary by the specific embodiment or example), and adjust a control-display gain for the gesture-controlled device 100 to a control-display gain determined based on the identified property (as in step 324 or a variant thereof).

Figure 10A:
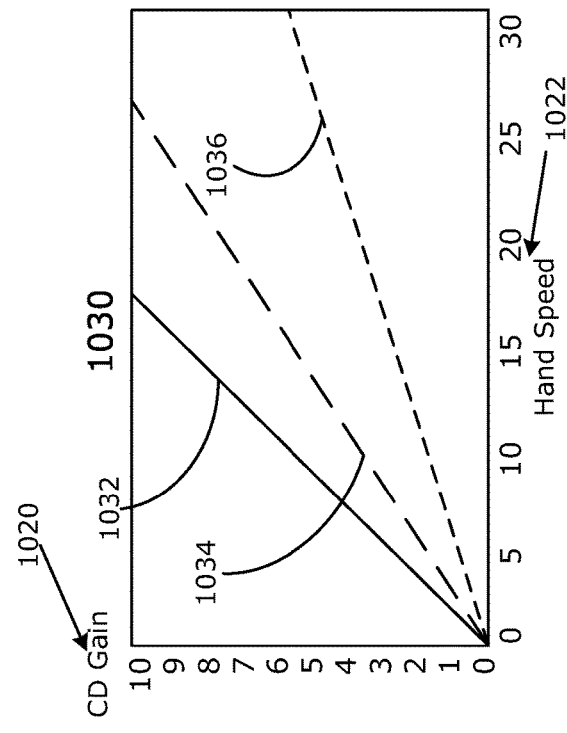
FIG. 10A shows a first graph of CD gain graphed against the speed of the dragging hand gesture of the method of FIG. 9 when the CD gain is set to a constant value.

FIG. 10A shows a first graph 1000 of CD gain 1020 graphed against the speed of the dragging hand gesture 1022 when the CD gain is set to a constant value. The graph 1000 shows three constant CD gain levels: a first CD gain level 1010 indicating a high CD gain, a second CD gain level 1012 indicating a moderate CD gain, and a third CD gain level 1014 indicating a low CD gain. The three levels 1010, 1012, 1014 may correspond to three CD gain level settings, which the gesture-controlled device 100 may switch between using one or more of the further techniques described below with reference to FIGS. 11-14.

Figure 10B:
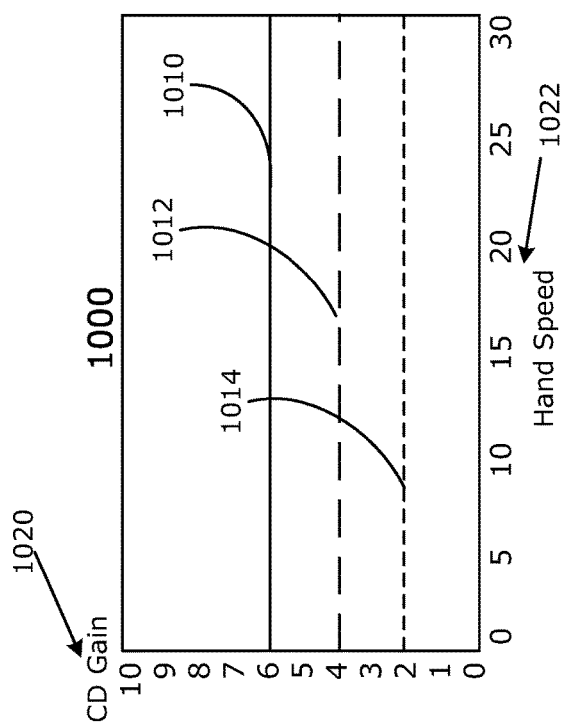
FIG. 10B shows a first graph of CD gain graphed against the speed of the dragging hand gesture of the method of FIG. 9 when the CD gain is CD gain is determined using a linear function.

FIG. 10B shows a second graph 1030 of CD gain 1020 graphed against the speed of the dragging hand gesture 1022 when the CD gain is determined at step 324 using a linear function as described above. The graph 1030 shows three linear CD gain functions: a first CD gain function 1032 indicating a high value for pre-defined constant c, a second CD gain function 1034 indicating a moderate value for pre-defined constant c, and a third CD gain function 1036 indicating a low value for pre-defined constant c. The three functions 1032, 1034, 1036 may correspond to three CD gain level settings, which the gesture-controlled device 100 may switch between using one or more of the further techniques described below with reference to FIGS. 11-14. In this way, the velocity-based CD gain level adjustment of method 300 may be combined with one or more of the methods described below for adjusting CD gain based on the location, orientation, or pausing behavior of the hand performing the dragging hand gesture.

Figure 10C:
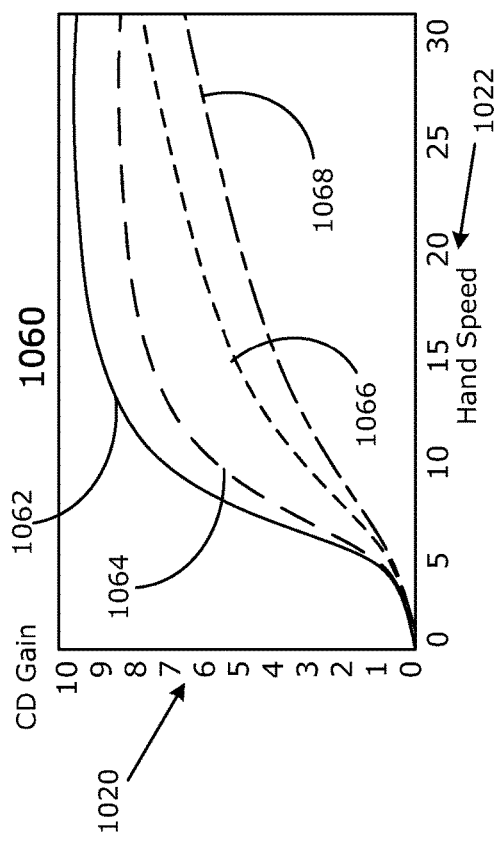
FIG. 10C shows a first graph of CD gain graphed against the speed of the dragging hand gesture of the method of FIG. 9 when the CD gain is CD gain is determined using a generalized logistic function.

FIG. 10C shows a third graph 1060 of CD gain 1020 graphed against the speed of the dragging hand gesture 1022 when the CD gain is determined at step 324 using a generalized logistic function as described above. The graph 1030 shows three linear CD gain functions: a first CD gain function 1062 indicating a first set of values for the logistic function variables set out in Table 1 below, a second CD gain function 1064 indicating a second set of values for the logistic function variables, a third CD gain function 1066 indicating a third set of values for the logistic function variables, and a fourth CD gain function 1068 indicating a fourth set of values for the logistic function variables.

TABLE 1

| Function | A | K | B | V | Q | C | M |
|---|---|---|---|---|---|---|---|
| 1062 | 0.1 | 10 | 0.3 | 0.05 | 0.1 | 1 | 3.5 |
| 1064 | 0.1 | 8 | 0.3 | 0.05 | 0.1 | 1 | 3.5 |
| 1066 | 0.1 | 8 | 0.2 | 0.05 | 0.3 | 1 | 0 |
| 1068 | 0.1 | 7 | 0.2 | 0.05 | 0.1 | 1 | 6 |

The four functions 1062, 1064, 1066, 1068 range from smooth (1066 and 1068) to steep (1062 and 1064) CD gain levels. Based on user testing, the first two steep functions (1062 and 1064) tend to be perceived as too slow when performing fine-grained movements, and too jumpy when making coarse-grained movements. Therefore, the last two smooth functions smooth (1066 and 1068) may be preferable for enabling usable automatic adjustment between coarse-grained and fine-grained gesture control.

The four functions 1062, 1064, 1066, 1068 may correspond to four CD gain level settings, which the gesture-controlled device 100 may switch between using one or more of the further techniques described below with reference to FIGS. 11-14. In this way, the velocity-based CD gain level adjustment of method 300 may be combined with one or more of the methods described below for adjusting CD gain based on the location, orientation, or pausing behavior of the hand performing the dragging hand gesture.

Example Methods for Location-Based Control-Display Gain Adjustment

In some embodiments, the CD gain of the gesture-controlled device 100 may be adjusted as a function of the location of a hand performing the mid-air gesture. Thus, in these example embodiments, the property of the hand performing the dragging hand gesture that is used to adjust the CD gain is a location of the mid-air hand gesture within the frame of a video of a user performing the mid-air hand gesture that is captured by the digital camera 102 of the gesture-controlled device 100.

Some embodiments use a vertical location of the hand within the frame to determine CD gain. Other embodiments use a horizontal location of the hand within the frame. Other embodiments may use other location criteria to determine CD gain, such as identifying a region of the frame into which a user is prompted to move the hand to effect a CD gain adjustment.

In examples using a dragging hand gesture, such as a dynamic "pinch-drag-release" gesture to effect a horizontal drag state 814 or vertical drag state 812 as described above with reference to FIG. 8, the direction or axis of the drag movement may be orthogonal (i.e. perpendicular) to the direction or axis used to determine the hand location for the purpose of adjusting CD gain. Thus, for example, if the gesture-controlled device 100 enters a "horizontal drag" state (i.e. a first axis determining drag direction is horizontal) in response to a user initiating a dragging hand gesture, the control-display gain subsystem 570 may adjust CD gain based on the vertical location of the hand performing the dragging hand gesture (i.e. a second axis determining CD gain adjustment is vertical). Similarly, if the gesture-controlled device 100 enters a vertical drag state 812 in response to a user initiating a dragging hand gesture, the control-display gain subsystem 570 may adjust CD gain based on the horizontal location of the hand performing the dragging hand gesture. Once the CD gain is adjusted, movement of the dragging hand gesture with respect to the first axis is translated to on-screen movement and control of the gesture-controlled device 100 by application of the adjusted CD gain based on the hand location with respect to the second axis. Thus, in some examples, the hand detection and tracking subsystem 516 stores the location of the dragging hand gesture in a queue that includes the locations of the dragging hand gesture while the gesture-controlled device is in a drag state. The hand detection and tracking subsystem 516 then determines a movement of the dragging hand gesture with respect to the first axis (e.g., horizontal) based the locations of the dragging hand gesture stored in the queue. The control-display gain subsystem 570 then applies the control-display gain to the movement to generate a drag control output value, wherein the control-display gain is determined based on the location of the mid-air hand gesture with respect to the second axis which is orthogonal to the first axis (e.g., vertical).

Examples described below refer to hand height (i.e. vertical location within the frame) as the location dimension used to adjust CD gain. It will be appreciated that any of the examples described below can be equally applied to embodiments using a different location dimension or value, such as horizontal location, depth relative to the camera 102, location within a region, etc.

Example embodiments will be described as adjusting the CD gain by changing a CD gain setting. It will be appreciated that a "CD gain setting" refers to a value, level, function, or configuration of the CD gain of the gesture-controlled device 100, such as one of the CD gain levels of FIG. 10A or one of the CD gain functions of FIGS. 10B-10C.

In some embodiments, CD gain may be adjusted to a setting selected from a set of discrete CD gain settings, such as one of the three levels 1010, 1012, 1014 of FIG. 10A, one of the three functions 1032, 1034, 1036 of FIG. 10B, or one of the four functions 1062, 1064, 1066, 1068 of FIG. 10C. The discrete CD gain setting may be determined based on detecting the location of the hand within one of a plurality of discrete regions of the frame. In some such embodiments, the location of the mid-air hand gesture is identified by determining that the mid-air hand gesture is located within a first region of the frame, and the control-display gain is adjusted to a first control-display gain corresponding to the first region. For example, the frame may be split into three horizontal regions (i.e. bands) stacked vertically on top of each other, corresponding to a high height indicating high CD gain, a middle height indicating moderate CD gain, and a low height indicating low CD gain. When the gesture-sensing system 500 detects the dragging hand gesture within one of the horizontal regions, the respective CD gain setting is selected and applied by the CD gain subsystem 570. For example, detection of the dragging hand gesture within the low height region may result in adjustment of the CD gain to the first level 1010 of FIG. 10A or first function 1032 of FIG. 10B, and so on.

In other embodiments, the CD gain may be adjusted to a setting selected from a continuous range of settings based on a continuous location value of the hand. For example, a continuous height value of the hand within the frame may be detected by the hand detection and tracking subsystem 516, resulting in the CD gain subsystem 570 computing a continuous CD gain setting based on the continuous height value. Examples of continuous CD gain settings include continuous ranges of CD gain levels (as in FIG. 10A) and continuous values for the parameters of CD gain functions (such as constant c in FIG. 10B or parameters K, B, W, A, Q, M, and/or C in FIG. 10C).

Some embodiments may determine hand height as a relative hand height with respect to a reference height level, such as the starting location of the hand (e.g., when the dragging hand gesture is initiated and the gesture-controlled device 100 enters the drag state). Other embodiments may determine hand height as an absolute hand height with respect to an absolute reference point (e.g. a part of the user's body visible within the video frame).

Figure 11:
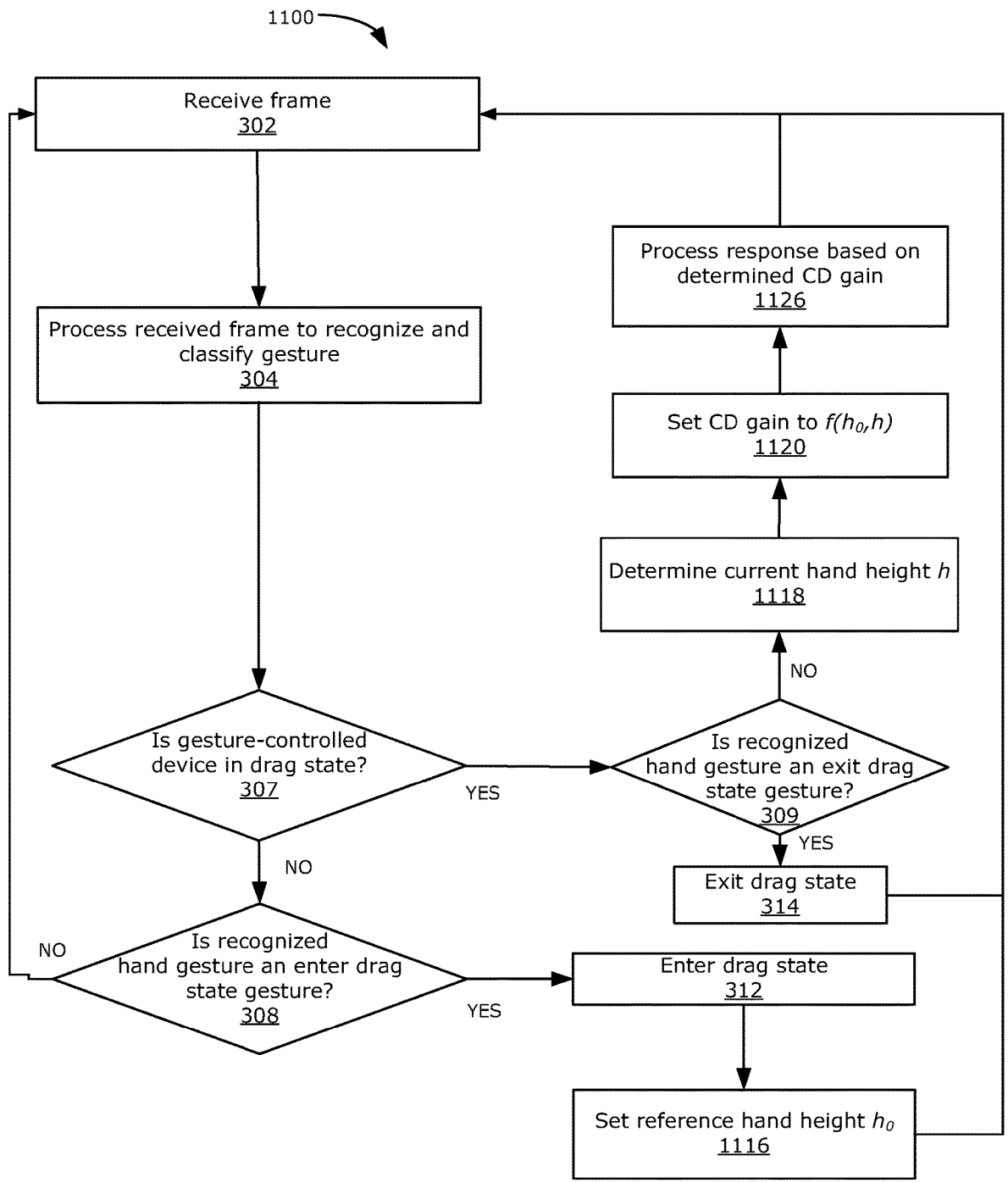
FIG. 11 is a flowchart illustrating an example location-based method for adjusting the control-display gain of the gesture-controlled device of FIG. 2.

FIG. 11 shows a location-based method 1100 for adjusting the control-display gain of the gesture-controlled device 100. In this method 1100, the vertical height within the frame of the hand performing the dragging hand gesture is used to adjust CD gain, and the hand height is determined as a relative hand height with reference to an initial hand height when the gesture-controlled device 100 enters the dragging state. It will be appreciated that the described steps of the method 1100 can be applied to other approaches for adjusting CD gain based on hand location.

Various steps in method 1100 are identified by the same reference numerals as steps of the velocity-based method 300 of FIG. 9. These steps of method 1100 operate identically or analogously to those steps, and will not be re-described.

At 1116, in response to determining that the gesture-controlled device 100 has entered a dragging state (at step 312), the CD gain subsystem 570 sets a reference hand height $h_0$. The value of $h_0$ is set equal to the current height of the hand performing the dragging hand gesture within the frame (determined by, e.g., the hand detection and tracking subsystem 516), and the value of $h_0$ is stored (e.g. in memory 208). The height values used in this method 1100 may be determined based on pixel locations of the hand or hand bounding box within the frame, they may be determined based on real-world height values extrapolated from other visual cues within the frame, or they may be determined based on other criteria. After step 1116, the method 1100 returns to step 302 to receive the next frame of the video.

At 1118, in response to determining that the gesture-controlled device 100 has not exited a dragging state (at step 314), the CD gain subsystem 570 determines current hand height h, equal to the current height of the hand performing the dragging hand gesture within the frame (determined by, e.g., the hand detection and tracking subsystem 516). The method 1100 then proceeds to step 1120.

At 1120, the CD gain of the gesture-controlled device 100 is adjusted to a new CD gain setting. The new CD gain setting is a function $f(h_0,h)$ of the reference hand height $h_0$ and current hand height h. Various functions can be used in different embodiments to map the hand height change to the new CD gain setting.

In some embodiments, an exponential function is used in which the new CD gain setting will be determined based on an exponential function of the hand height change. For example, in embodiments using a continuous range of CD gain levels or continuous parameters for CD gain functions as described above, a CD gain level or CD gain function parameter value of the new CD gain setting may be determined as $f(h_0,h)=c \times b^{(h-h_0)}$ wherein c and b are constants. In embodiments using discrete CD gain settings, the new setting may be selected from a plurality of settings based on the function $f(h_0,h)=c \times b^{(h-h_0)}$ as computed above: for example, if the computed function is above a threshold value, a first CD gain setting may be selected, otherwise a second CD gain setting may be selected.

In other embodiments, a linear function is used to map the hand height difference to a new CD gain setting. In some such embodiments, the function may be defined as $f(h_0,h)=c \times (b+h-h_0)$. Continuous and discrete CD gain settings may be determined as described above.

In these examples, parameter values such as c and b can be set such that for low hand positions, CD gain reaches 0.

At 1126, as at step 326 of method 300, the CD gain subsystem 570 adjusts a CD gain of the gesture-controlled device 100 to the CD gain determined at step 1120. A pointer, cursor, or progress bar rendered on the display 104 of the gesture-controlled device 100 is controlled using the adjusted CD gain.

Step 1126 may also, in some embodiments, provide feedback to the user of the gesture-controlled device 100 indicating the CD gain adjustment or current CD gain setting. The user feedback subsystem 562 may be used to present visual feedback to the user via the display 104. In addition, auditory feedback and/or other modalities of feedback may be presented to the user using output devices (e.g., speakers) in communication with the I/O interface 204 of the gesture-controlled device 100.

The purpose of the feedback is to make the CD gain changes visible or otherwise perceptible to the user of the gesture-controlled device 100, thereby letting the user know what level of CD gain he or she is experiencing at each moment. Visual feedback may include changing a color of the controlled object (e.g., a progress bar that changes from blue to green as the CD gain is adjusted from a low setting to a high setting); changing a shape or thickness of the controlled object (e.g., progress bar width); and/or showing a CD gain scale on or near the controlled object (e.g. a graphical or textual indication of current CD gain or change in CD gain). Auditory feedback may include playing a sound whenever the CD gain level changes; playing a sound repeatedly with the rate of repetition scaled by CD gain level (e.g., a tick sound is made at every scale 1 movement when the gesture-controlled device 100 is at a high CD gain level, whereas the same sound is played at every scale 10 movements when the gesture-controlled device 100 is at a low CD gain level, such that a user will hear 10 times more tick sounds at the high CD gain level than at low CD gain level for the same amount of movement).

Example Methods for Orientation-Based Control-Display Gain Adjustment

In some embodiments, the CD gain of the gesture-controlled device 100 may be adjusted as a function of the orientation of a hand performing the mid-air gesture. Thus, in these example embodiments, the property of the hand performing the dragging hand gesture that is used to adjust the CD gain is an orientation of the hand performing the mid-air hand gesture relative to a reference orientation.

Some embodiments use an angle of the hand relative to a reference orientation to determine CD gain. For example, the CD gain may be adjusted based on the angle of the hand between a first orientation in which the fingers of the hand are pointed (i.e. oriented) upward, and a second orientation in which the fingers of the hand are pointed downward. The angle of the hand may be determined relative to a reference orientation, for example a fixed horizontal hand orientation in which the fingers are pointed horizontally, or a reference orientation defined by the orientation of the hand when the gesture-controlled device 100 enters a drag state. The angle of the hand may be measured with respect to a vertical plane, such as the vertical X-Y plane described below with reference to FIG. 12. Other embodiments may use other hand orientation criteria to determine CD gain, such as a radial angle about a vertical axis or about an axis projecting outward from the camera 102.

As in location-based method 1100, some embodiments may adjust the CD gain by selecting a new CD gain setting from a set of discrete settings. In some embodiments, the orientation of the mid-air hand gesture is identified by determining that the mid-air hand gesture is located within a first range of rotation of a plurality of ranges of rotation between the first position and the second position, and the control-display gain (i.e. the new CD gain setting) is a first control-display gain corresponding to the first range of rotation. Other embodiments may select the new CD gain setting from a continuous range of values.

Figure 12:
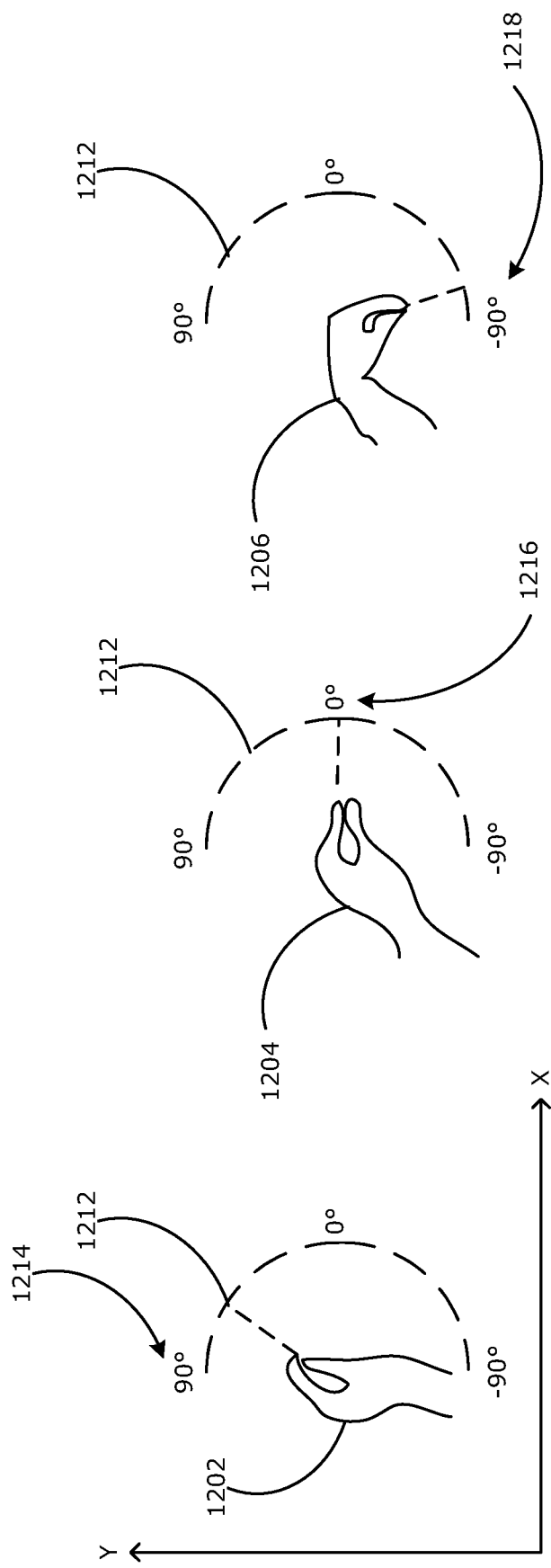
FIG. 12 shows example hand orientations of a hand performing the pinch closed gesture of FIG. 3D.

FIG. 12 shows example hand orientations of a hand performing a "pinch closed" gesture 36. In a first position 1202, the fingers of the hand are pointed upward, proximal to a 90 degree upward position 1214 from horizontal as defined by a 180 degree arc 1212 inscribed in the X-Y plane. In an intermediate position 1204, the fingers of the hand are pointed rightward, proximal to a 0 degree horizontal position 1216 as defined by the arc 1212. In a second position 1206, the fingers of the hand are pointed downward, proximal to a negative 90 degree downward position 1218 as defined by the arc 1212.

In some embodiments, the gesture recognition subsystem 522 and/or CD gain subsystem 570 may determine the orientation of the dragging hand gesture and determine a new continuous CD gain setting as a function of the angle of rotation between the first orientation 1202 and second orientation 1206. In other embodiments, the new CD gain setting is selected from a set of discrete settings based on the angle of the hand being within one of a plurality of arcs or angle ranges, e.g., a low CD gain setting is selected if the angle within arc 1212 is between 90 degrees and 45 degrees, a moderate CD gain setting is selected if the angle within arc 1212 is between 45 degrees and negative 45 degrees, and a high CD gain setting is selected if the angle within arc 1212 is between negative 45 degrees and negative 90 degrees.

In other embodiments, the CD gain level is increased or decreased the longer the user holds the angle above or below the horizontal. Thus, CD gain may be increased over time as the hand is held in the second position 1206, and then the CD gain is held constant once the user returns the hand to the intermediate position 1204. Similarly, to return CD gain to the original level, CD gain may be decreased over time as the hand is held in the first position 1202, and then the CD gain is then held constant once the user returns the hand to the intermediate position 1204.

It will be appreciated that the vertical X-Y plane in which the hand positions of FIG. 12 are shown may be the plane of the video frame, or may be a plane in 3D space extrapolated by the hand detection and tracking subsystem 516 or gesture recognition subsystem 522 based on a detected hand or wrist orientation. Thus, in some embodiments the hand angle of the pinch closed gesture 36 may be determined even if the hand is viewed by the camera 102 from a different direction, such as from the right side of FIG. 12.

Figure 13:
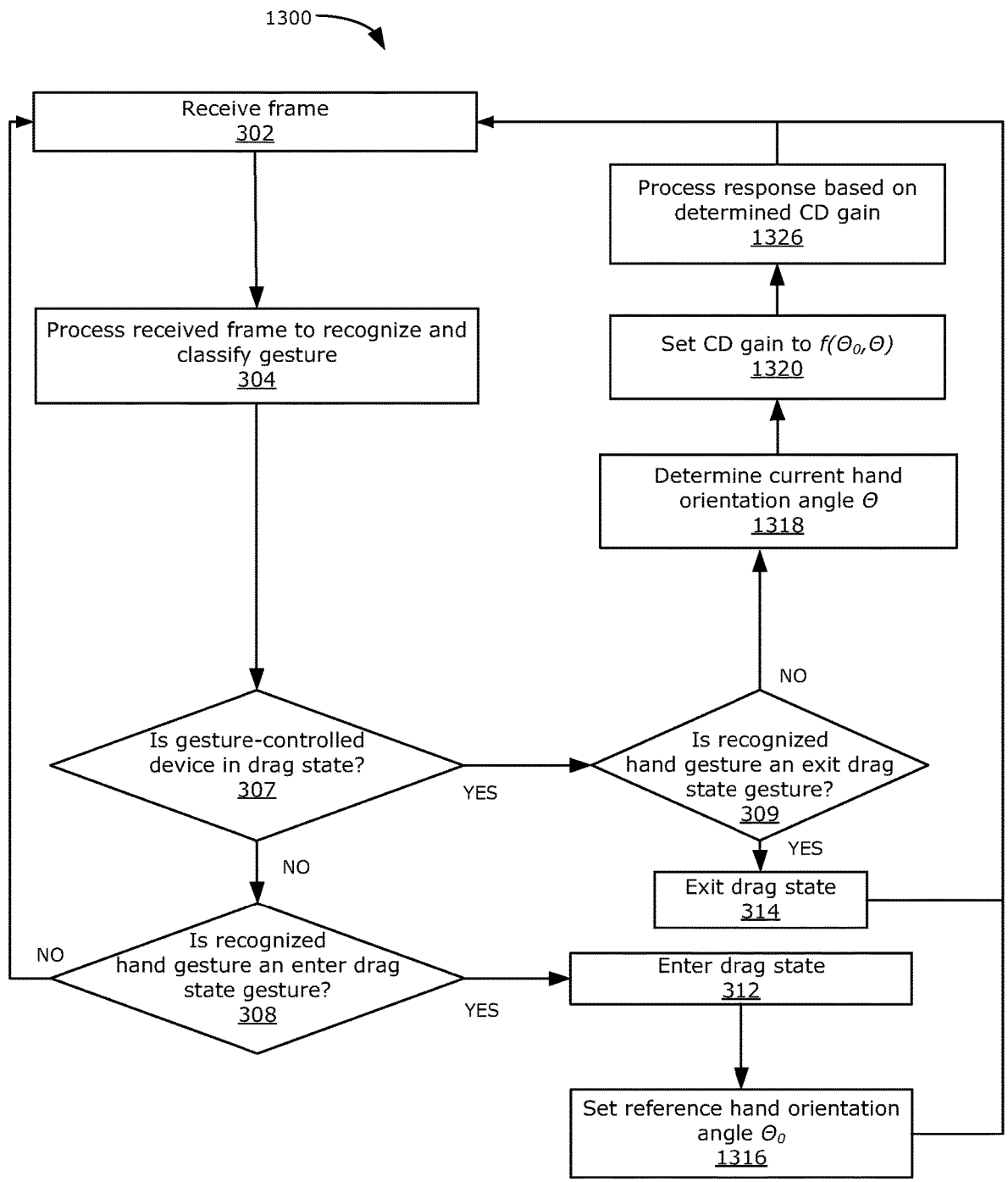
FIG. 13 is a flowchart illustrating an example orientation-based method for adjusting the control-display gain of the gesture-controlled device of FIG. 2.

FIG. 13 shows an orientation-based method 1300 for adjusting the control-display gain of the gesture-controlled device 100. In this method 1300, as described below, the orientation of the hand performing the dragging hand gesture is used to adjust CD gain, and hand orientation is described in reference to an angle of between a first orientation (e.g., the 90 degree position 1214) and a second orientation (e.g., the negative 90 degree position 1218) of FIG. 12. It will be appreciated that the described steps of the method 1300 can be applied to other approaches for adjusting CD gain based on hand orientation.

Various steps in method 1300 are identified by the same reference numerals as steps of the velocity-based method 300 of FIG. 9. These steps of method 1300 operate identically or analogously to those steps, and will not be re-described.

At 1316, in response to determining that the gesture-controlled device 100 has entered a dragging state (at step 312), the CD gain subsystem 570 sets a reference hand orientation angle $\Theta_0$. The reference hand orientation angle $\Theta_0$ is set equal to a current hand orientation angle. For example, in an embodiments using the pinch closed gesture 36 as the dragging hand gesture, the current hand orientation angle is an angle of the direction of the fingers of the pinch closed gesture 36 of FIG. 12 as defined by arc 1212, varying between 90 and −90 degrees. After step 1316, the method 1300 returns to step 302 to receive the next video frame.

At 1318, in response to determining that the gesture-controlled device 100 has not exited a dragging state (at step 314), the current hand orientation angle is determined by the gesture recognition subsystem 522 and/or CD gain subsystem 570 by determining an orientation angle of the hand performing the dragging hand gesture in the video frame. After step 1318, the method 1300 proceeds to step 1320.

At 1320, the CD gain of the gesture-controlled device 100 is adjusted to a new CD gain setting. The new CD gain setting is a function $f(\Theta_0, \Theta)$ of the reference hand orientation angle $\Theta_0$ and current hand orientation angle $\Theta$. Various functions can be used in different embodiments to map the hand orientation angle change to the new CD gain setting, such as linear or exponential mapping functions as described with reference to FIG. 11 above.

At 1326, as at step 326 of method 300, the CD gain subsystem 570 adjusts a CD gain of the gesture-controlled device 100 to the CD gain determined at step 1320. A pointer, cursor, or progress bar rendered on the display 104 of the gesture-controlled device 100 is controlled using the adjusted CD gain. Some embodiments may also present feedback to the user at step 1326, as described above with reference to step 1126 of FIG. 11.

Example Methods for Pause-Based Control-Display Gain Adjustment

Whereas velocity-based method 300 is described above as a method for adjusting the CD gain of the gesture-controlled device 100 as a function of the velocity of a hand performing the mid-air gesture, other velocity-based methods of CD gain adjustment may be employed in combination with or in place of the various methods described above. Example pause-based methods for adjusting CD gain will now be described, which detect pauses in the movement of the hand performing the mid-air gesture and adjust CD gain upon detecting such pauses. Thus, in these example embodiments, the property of the hand performing the dragging hand gesture that is used to adjust the CD gain is a velocity of the hand performing the dragging hand gesture, and in particular detecting that the velocity of the hand has remained below a speed threshold for at least a time threshold of time.

Thus, in these example embodiments the velocity of the mid-air hand gesture may be identified by determining a location of the dragging hand gesture, storing the location of the dragging hand gesture in a queue that includes one or more locations of the dragging hand gesture while the gesture-controlled device is in a dragging state, and determining the velocity of the dragging hand gesture based the one or more locations of the dragging hand gesture stored in the queue. CD gain may be adjusted in response to determining that the velocity has been below a velocity threshold for at least a dwell time threshold, and that the gesture-controlled device is in a first control-display gain state of a plurality of control-display gain states. Once CD gain adjustment is triggered, the gesture-controlled device is placed into a second control-display gain state of the plurality of control-display gain states, and the control-display gain is adjusted to a control-display gain corresponding to the second control-display gain state.

In these embodiments, a pause in the dragging movement of the hand triggers an adjustment of the CD gain. Some embodiments, upon detecting a pause in the movement of the hand, switch between or among two or more discrete CD gain settings, e.g., between a high CD gain setting and a low CD gain setting. Other embodiments may trigger different adjustments CD gain in response to detecting pauses, such as increasing or decreasing a continuous CD gain setting the longer a pause lasts. It will be appreciated that the methods described below may be modified to accommodate different CD gain adjustments in response to detecting pauses.

A pause in the dragging movement of the dragging hand gesture may be referred to as dwelling. A pre-defined threshold for dwelling time can be used as a signal for adjusting CD gain to a new CD gain setting. The gesture-controlled device 100 will maintain the new CD gain setting until the user dwells again and the CD gain setting reverts back to the initial setting.

Figure 14:
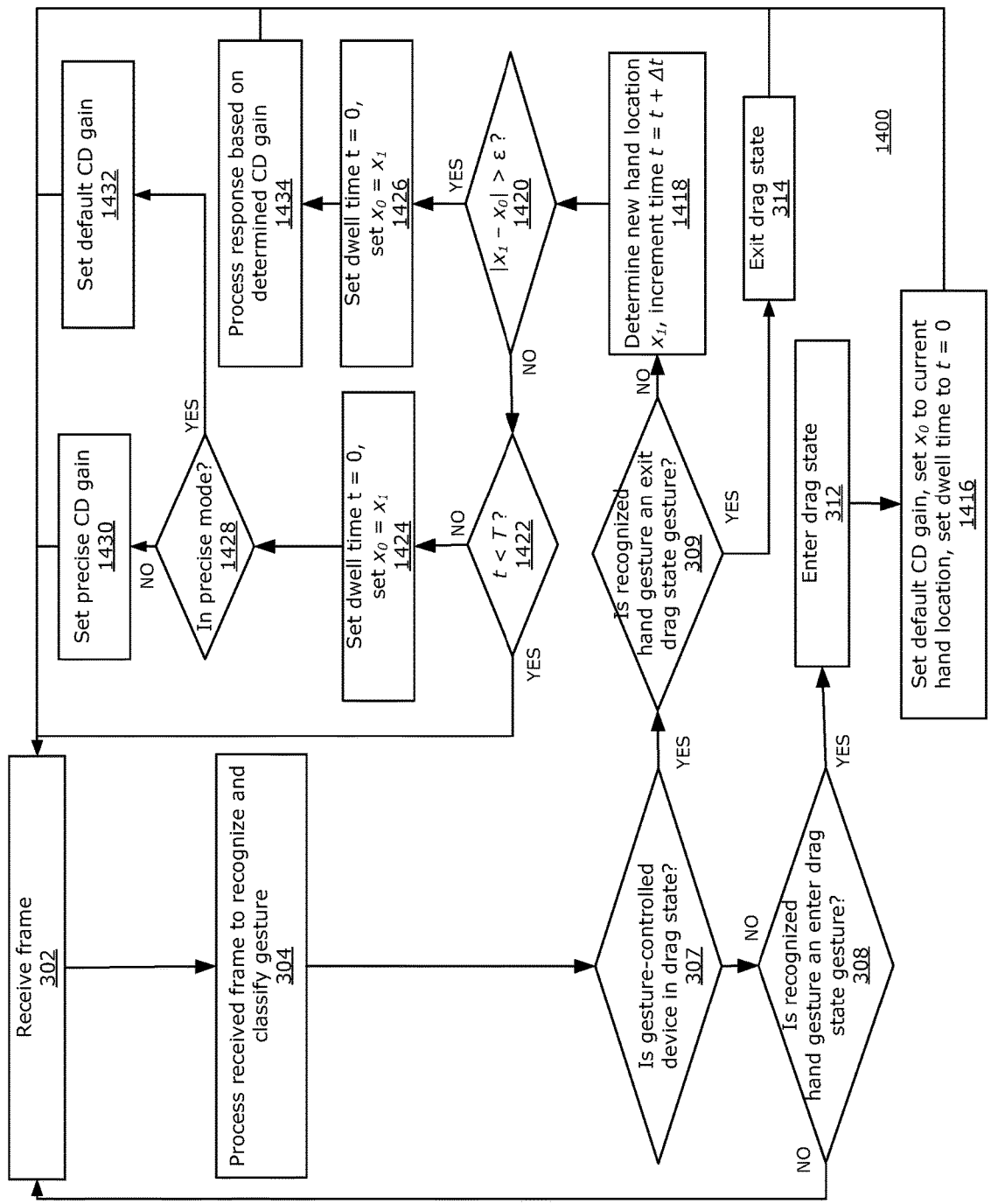
FIG. 14 is a flowchart illustrating an example pause-based method for adjusting the control-display gain of the gesture-controlled device of FIG. 2.

FIG. 14 shows a pause-based method 1400 for adjusting the control-display gain of the gesture-controlled device 100. In this method 1400, as described below, a pause in the movement of the hand performing the dragging hand gesture is used to adjust CD gain, wherein a pause is defined as a period of time of at least time threshold T during which hand speed does not rise above speed threshold $\varepsilon/\Delta t$ (wherein $\varepsilon$ is a constant distance and $\Delta t$ is the time between two consecutive received video frames). It will be appreciated that the described steps of the method 1400 can be applied to other approaches for adjusting CD gain based on pausing behavior.

Various steps in method 1400 are identified by the same reference numerals as steps of the velocity-based method 300 of FIG. 9. These steps of method 1400 operate identically or analogously to those steps, and will not be re-described.

At 1416, in response to determining that the gesture-controlled device 100 has entered a dragging state (at step 312), the CD gain subsystem 570 sets the CD gain to a default initial setting, sets a hand location reference $x_0$ to the current hand location (e.g., as detected by the hand detection and tracking subsystem 516), and sets a dwell time value t to t=0. By setting the CD gain to the default initial setting, this means that each time a new dragging hand gesture is initiated, a dragging state begins with a default CD gain level. After step 1416, the method 1400 returns to step 302 to receive the next frame.

At 1418, in response to determining that the gesture-controlled device 100 has not exited a dragging state (at step 314), the hand detection and tracking subsystem 516 determines a current hand location $x_1$, and increments the dwell time value t to t=t+$\Delta t$, wherein $\Delta t$ is the time between two consecutive received frames. After step 1418, the method 1400 proceeds to step 1420.

At 1420, the CD gain subsystem 570 computes the distance that the hand has moved in between frames and compares this computed distance $|x_1-x_0|$ to a distance threshold $\varepsilon$. If $|x_1-x_0|>\varepsilon$, this indicates that the hand has moved faster than a speed threshold $\varepsilon/\Delta t$ in the last frame (i.e. over time period $\Delta t$), and the method 1400 proceeds to step 1426. If $|x_1-x_0|\leq\varepsilon$, this indicates a pause of settle behavior of the hand, and the method 1400 proceeds to step 1422.

The constant value $\varepsilon$ may be chosen based on the frame rate (which determines $\Delta t$) and based on an expected speed of user hand movement in performing the dragging hand gesture. A very small value of $\varepsilon$ is typically chosen to prevent accidental CD gain change by a user moving the dragging hand gesture slowly but not intending to pause.

At 1426, in response to detecting that the hand is moving faster than the speed threshold, the CD gain subsystem 570 resets the dwell time value t to t=0, resets the reference hand location $x_0$ to current hand location value $x_1$, and proceeds to step 1434.

At 1422, the CD gain subsystem 570 compares the dwell time value t to a dwell time threshold T. If t<T, indicating that the hand has not dwelled for a long enough period to indicate an intentional pause, the method 1400 returns to step 302 to receive the next frame. If t≥T, indicating that the hand has dwelled for a long enough period to indicate an intentional pause, the method 1400 proceeds to step 1424.

At 1424, in response to detecting an intentional pause (i.e. a pause longer than dwell threshold T), the CD gain subsystem 570 resets the dwell time value t to t=0, resets the reference hand location $x_0$ to current hand location value $x_1$, and proceeds to step 1428.

In some embodiments, the default initial CD gain is a moderate CD gain setting, and the new CD gain setting triggered by a pause is a low CD gain setting (also called a "precise mode") enabling fine-grained control. A second pause reverts to the initial default moderate CD gain setting.

Thus, at 1428, the CD gain subsystem 570 triggers a change in CD gain in response to the detected pause. If the current CD gain setting is a precise CD gain mode (i.e. a low CD gain level or function enabling fine-grained control), the method proceeds to step 1432 to revert the gesture-controlled device 100 to the initial default CD gain setting. If the current CD gain setting is not the precise CD gain mode (i.e. the current CD gain setting is the initial default CD gain setting), the method proceeds to step 1430 to put the gesture-controlled device 100 into the new, low CD gain setting (i.e. precise mode). It will be appreciated that other embodiments may use different CD gain settings for steps 1430 and 1432.

After the CD gain setting is changes at step 1430 or 1432, the method 1400 returns to step 302 to receive the next frame.

Whereas each method of CD gain adjustment 300, 1100, 1300, 1400 is described above as a stand-alone CD gain adjustment method, it will be appreciated that some embodiments may combined two or more of the described methods, or may use different variants or different combinations of said methods in different contexts. For example, a gesture-controlled device may have an audio volume control process using a vertical dragging gesture and a video scrubbing process using a horizontal dragging gesture. In a first embodiment, the audio volume control process may use velocity-based method 300 with a first set of parameters for the generalized logistic function, and the video scrubbing process may use velocity-based method 300 with a second set of parameters for the generalized logistic function. In a second embodiment, the audio volume control process may use velocity-based method 300, and the video scrubbing process may use orientation-based method 1300. In a third embodiment, the audio volume control process may use velocity-based method 300 wherein the different generalized logistic functions 1062, 1064, 1066, 1068 are selected based on the location-based method 1100. In a fourth embodiment, the audio volume control process may use location-based method 1100 combined with orientation-based method 1300 such that either hand location or hand orientation, or some weighted combination of location and orientation, may be used to adjust CD gain. In a fifth embodiment, the audio volume control process may use orientation-based method 1300 combined with pause-based method 1400 such that a pause over the dwell threshold triggers a CD gain adjustment state during which the user may change the orientation of the hand to trigger a CD gain change; when the hand is engaged in the dragging motion, the orientation of the hand gesture is ignored. In a sixth embodiment, the audio volume control process may use location-based method 1100 combined with pause-based method 1400 such that a pause over the dwell threshold triggers a CD gain adjustment state during which the user may change the location of the hand (e.g., a horizontal location, orthogonal to the vertical dragging motion) to trigger a CD gain change; when the hand is engaged in the dragging motion, the (e.g., horizontal) location of the hand gesture is ignored for the purpose of CD gain change. Other combination or variants are possible, as will be appreciated.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for controlling a gesture-controlled device, the method comprising:
   obtaining a plurality of video frames;
   for each video frame of the plurality of video frames:
      processing the video frame to detect a shape of a hand in the video frame; and
      generating gesture data for the video frame based on the shape of the hand;
   processing the gesture data for each video frame of the plurality of video frames to determine that the hand is performing a hand gesture;
   adjusting a control-display gain function for the gesture-controlled device based on at least one of a location of the hand performing the hand gesture, and an orientation of the hand performing the hand gesture relative to a reference orientation.

2. The method of claim 1, the method further comprising:
   storing the location of the hand in a queue that includes one or more locations of the hand; and
   determining a movement of the hand with respect to a first axis based on the one or more locations of the hand stored in the queue;
   wherein the control-display gain function is determined based on the location of the hand with respect to a second axis orthogonal to the first axis.

3. The method of claim 1, wherein:
   identifying the location of the hand comprises determining that the hand is located within a first region of the video frame; and
   the control-display gain function is a first control-display gain function corresponding to the first region.

4. The method of claim 1, wherein the orientation of the hand comprises an angle of the hand relative to the reference orientation.

5. The method of claim 4, wherein the angle of the hand is measured with respect to a vertical plane.

6. The method of claim 4, wherein:
   identifying the orientation of the hand comprises determining that the angle of the hand is within a first angle range defined between a first angle and a second angle; and
   adjusting the control-display gain function comprises adjusting the control-display gain function to a first control-display gain function corresponding to the first angle range.

7. The method of claim 1, further comprising adjusting the control-display gain function for the gesture-controlled device based on a velocity of the hand.

8. The method of claim 7, wherein:
   identifying the velocity of the hand comprises:
      determining a location of the hand;
      storing the location of the hand in a queue that includes one or more locations of the hand; and
      determining the velocity of the hand based on the one or more locations of the hand stored in the queue.

9. The method of claim 8, wherein:
   adjusting the control-display gain function comprises:
      in response to determining that the velocity has been below a velocity threshold for at least a dwell time threshold, and that the gesture-controlled device is in a first control-display gain state of a plurality of control-display gain states:
         placing the gesture-controlled device into a second control-display gain state of the plurality of control-display gain states; and
         adjusting the control-display gain function to a control-display gain function corresponding to the second control-display gain state.

10. The method of claim 1, further comprising:
    obtaining a further plurality of video frames;
    processing the plurality of video frames to detect a velocity of a hand within the plurality of video frames; and
    applying the control-display gain function to the detected velocity of the hand to determine a cursor velocity; and
    displaying the cursor on a display screen of the gesture-controlled device, the cursor being displayed to exhibit the cursor velocity.

11. The method of claim 10, wherein the control-display gain function is a constant control-gain level, such that the cursor velocity is at a constant proportion to the velocity of the hand.

12. The method of claim 10, wherein the control-display gain function is a linear function of the velocity of the hand, such that the cursor velocity is at a proportion to the velocity of the hand linearly varying in proportion to the velocity of the hand.

13. The method of claim 10, wherein the control-display gain function is a generalized logistic function of the velocity of the hand, such that the cursor velocity is at a proportion to the velocity of the hand varying as a generalized logistic function of the velocity of the hand.

14. A gesture-controlled device comprising:
a processor device; and
a memory storing machine-executable instructions thereon which, when executed by the processing device, cause the gesture-controlled device to:
obtain a plurality of video frames;
for each video frame of the plurality of video frames:
process the video frame to detect a shape of a hand in the video frame; and
generate gesture data for the video frame based on the shape of the hand;
process the gesture data for each video frame of the plurality of video frames to determine that the hand is performing a hand gesture;
adjust a control-display gain function for the gesture-controlled device based on at least one of a location of the hand performing the hand gesture, and an orientation of the hand performing the hand gesture relative to a reference orientation.

15. The gesture-controlled device of claim 14, further comprising adjusting the control-display gain function based on a velocity of the hand.

16. A non-transitory processor-readable medium having machine-executable instructions stored thereon which, when executed by a processor of a gesture-controlled device, cause the processor device to:
obtain a plurality of video frames;
for each video frame of the plurality of video frames:
process the video frame to detect a shape of a hand in the video frame; and
generate gesture data for the video frame based on the shape of the hand;
process the gesture data for each video frame of the plurality of video frames to determine that the hand is performing a hand gesture;
adjust a control-display gain function for the gesture-controlled device based on at least one of a location of the hand performing the hand gesture, and an orientation of the hand performing the hand gesture relative to a reference orientation.

* * * * *